(12) United States Patent
Tanaka et al.

(10) Patent No.: US 12,228,038 B2
(45) Date of Patent: Feb. 18, 2025

(54) VARIABLE GEOMETRY TURBINE AND TURBOCHARGER

(71) Applicant: MITSUBISHI HEAVY INDUSTRIES ENGINE & TURBOCHARGER, LTD., Sagamihara (JP)

(72) Inventors: Toshimitsu Tanaka, Tokyo (JP); Bipin Gupta, Tokyo (JP); Nao Taniguchi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/272,676

(22) PCT Filed: Dec. 13, 2021

(86) PCT No.: PCT/JP2021/045822
§ 371 (c)(1),
(2) Date: Jul. 17, 2023

(87) PCT Pub. No.: WO2022/158165
PCT Pub. Date: Jul. 28, 2022

(65) Prior Publication Data
US 2024/0301803 A1    Sep. 12, 2024

(30) Foreign Application Priority Data
Jan. 21, 2021    (JP) .................................. 2021-008254

(51) Int. Cl.
*F01D 17/16* (2006.01)
*F01D 9/02* (2006.01)

(52) U.S. Cl.
CPC ........... *F01D 17/165* (2013.01); *F01D 9/026* (2013.01); *F05D 2220/40* (2013.01)

(58) Field of Classification Search
CPC ..... F01D 17/165; F01D 9/026; F05D 2220/40
See application file for complete search history.

(56) References Cited

U.S. PATENT DOCUMENTS 7,255,530 B2      8/2007  Vogiatzis et al.
7,305,826 B2 *   12/2007  Kuster .................. F01D 17/165
                                                                 60/602
(Continued)

FOREIGN PATENT DOCUMENTS

JP          11-229815 A         8/1999
JP        2000154728 A    *    6/2000
WO    WO 2013/080795 A1         6/2013

OTHER PUBLICATIONS

JP2000154728 English Translation (Year: 2000).*

*Primary Examiner* — Jesse S Bogue
(74) *Attorney, Agent, or Firm* — Birch, Stewart, Kolasch & Birch, LLP

(57) ABSTRACT

A variable geometry turbine includes a variable nozzle unit for adjusting a flow of exhaust gas in an exhaust gas passage for introducing exhaust gas to the turbine rotor. The variable nozzle unit includes a plurality of nozzle vanes disposed in the exhaust gas passage at intervals in the circumferential direction of the turbine rotor. When the exhaust gas passage is divided into a near-tongue region in the vicinity of a tongue portion of the scroll passage and a far-tongue region which is a region other than the near-tongue region, the plurality of nozzle vanes includes at least one near-tongue nozzle vane disposed in the near-tongue region and at least one far-tongue nozzle vane disposed in the far-tongue region. The at least one near-tongue nozzle vane has, in at least one of a leading edge or a trailing edge of the near-tongue nozzle vane, a notch that is cut out to a greater extent than a leading edge or a trailing edge of the far-tongue nozzle vane.

13 Claims, 20 Drawing Sheets

(56) References Cited

U.S. PATENT DOCUMENTS

| | | | | |
|---|---|---|---|---|
| 10,227,889 | B2* | 3/2019 | Arnold | F02C 6/12 |
| 11,333,071 | B2* | 5/2022 | Williams | F02C 6/12 |
| 11,530,618 | B2* | 12/2022 | Jaeger | F01D 17/165 |
| 12,012,861 | B2* | 6/2024 | Karstadt | F02C 6/12 |
| 2014/0341729 | A1 | 11/2014 | Osako et al. | |
| 2023/0287806 | A1* | 9/2023 | Brookes | F01D 9/02 |
| 2024/0117752 | A1* | 4/2024 | Kobayashi | F01D 9/026 |

* cited by examiner

VARIABLE GEOMETRY TURBINE AND TURBOCHARGER

TECHNICAL FIELD

The present disclosure relates to a variable geometry turbine and a turbocharger including the variable geometry turbine.

The present application claims priority based on Japanese Patent Application No. 2021-008254 filed on Jan. 21, 2021, the entire content of which is incorporated herein by reference.

BACKGROUND ART

Conventionally, a variable geometry exhaust turbocharger equipped with a variable geometry turbine is known as an exhaust turbocharger for supercharging intake air of an internal combustion engine (engine) by using energy of exhaust gas of the internal combustion engine (see Patent Document 1, for example). The variable geometry turbine includes a plurality of nozzle vanes arranged in the circumferential direction in an exhaust gas passage that leads from the scroll passage of the turbine to the turbine rotor, and the flow-path cross-sectional area of the exhaust gas passage (flow passage between adjacent nozzle vanes) can be adjusted by changing the blade angle of these nozzle vanes with an external actuator. By adjusting the flow-path cross-sectional area of the exhaust gas passage, the variable geometry turbine can change the flow velocity and the pressure of exhaust gas introduced into the turbine rotor to enhance the supercharging effect.

Patent Document 1 discloses that a notch provided in the blade height middle portion of the trailing edge of each nozzle vane allows exhaust gas around the intermediate position of the exhaust gas passage to be discharged early, thereby reducing the gap flow based on the pressure difference.

CITATION LIST

Patent Literature

Patent Document 1: JPH11-229815A

SUMMARY

Problems to be Solved

The load applied to a nozzle vane varies with the pulsation of an internal combustion engine (engine). The load acting on the nozzle vane may reduce the clearance between a vane shaft fixed to the nozzle vane and another part supporting the nozzle vane and bring them into contact. Frequent contact between the vane shaft and the other part during operation of the variable geometry turbine may cause wear of the vane shaft, resulting in damage.

If the direction of action of the load on the vane shaft is reversed in a short period of time, about one cycle of pulsation of the internal combustion engine, the contact occurs frequently and there is a high risk of wear of the vane shaft, so it is necessary to take measures. In particular, the nozzle vane disposed near the tongue portion of the scroll passage may reverse the direction of action of the load on the vane shaft in a short period of about one cycle of pulsation of the internal combustion engine due to the wake (flow distortion) that occurs at the tongue portion with exhaust gas flow. Patent Document 1 does not focus on the issue of suppressing the wear of the vane shaft caused by pulsation of the internal combustion engine (engine).

In view of the above, an object of at least one embodiment of the present disclosure is to provide a variable geometry turbine and a turbocharger including the variable geometry turbine whereby it is possible to improve the reliability and durability of the variable geometry turbine by suppressing the wear of the vane shafts.

Solution to the Problems

A variable geometry turbine according to an embodiment of the present disclosure includes: a turbine rotor; a scroll passage forming part which forms a scroll passage on an outer peripheral side of the turbine rotor; an exhaust gas passage forming part which forms an exhaust gas passage for introducing an exhaust gas from the scroll passage to the turbine rotor; and a variable nozzle unit for adjusting a flow of the exhaust gas in the exhaust gas passage. The variable nozzle unit includes: a plurality of nozzle vanes disposed in the exhaust gas passage at intervals in a circumferential direction of the turbine rotor; and a rotation mechanism part configured to rotate the plurality of nozzle vanes about respective rotation centers. When the exhaust gas passage is divided into a near-tongue region in the vicinity of a tongue portion of the scroll passage and a far-tongue region which is a region other than the near-tongue region, the plurality of nozzle vanes includes at least one near-tongue nozzle vane disposed in the near-tongue region and at least one far-tongue nozzle vane disposed in the far-tongue region. The at least one near-tongue nozzle vane has, in at least one of a leading edge or a trailing edge of the near-tongue nozzle vane, a notch that is cut out to a greater extent than a leading edge or a trailing edge of the far-tongue nozzle vane.

A turbocharger according to an embodiment of the present disclosure includes the variable geometry turbine and a centrifugal compressor configured to be driven by the variable geometry turbine.

Advantageous Effects

At least one embodiment of the present disclosure provides a variable geometry turbine and a turbocharger including the variable geometry turbine whereby it is possible to improve the reliability and durability of the variable geometry turbine by suppressing the wear of the vane shafts.

DETAILED DESCRIPTION

Figure 1:
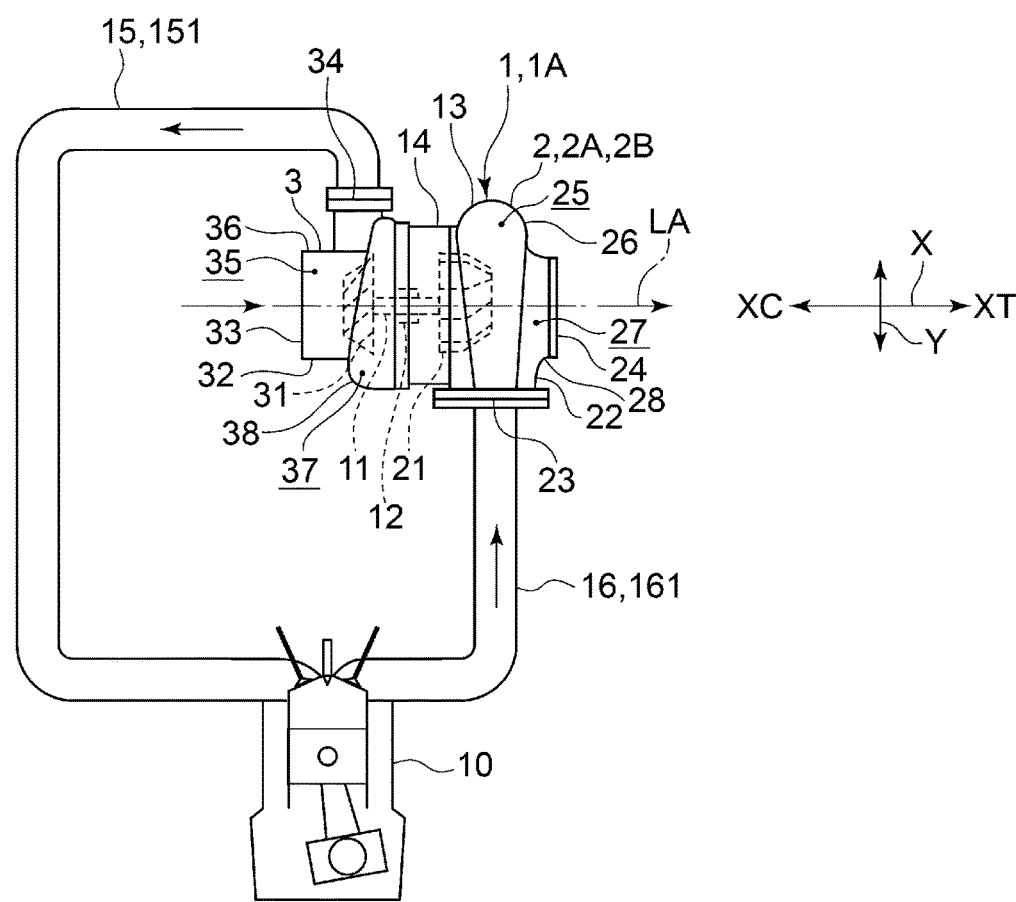
FIG. 1 is a schematic configuration diagram schematically showing the configuration of an internal combustion engine system equipped with a turbocharger according to an embodiment of the present disclosure.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Turbocharger)

FIG. 1 is a schematic configuration diagram schematically showing the configuration of an internal combustion engine system equipped with a turbocharger according to an embodiment of the present disclosure. In the following embodiments, an exhaust turbocharger 1A will be described as an example, but the present disclosure can be applied to a turbocharger 1 other than the exhaust turbocharger 1A.

As shown in FIG. 1, the turbocharger 1 according to some embodiments includes an exhaust turbocharger 1A configured to be driven by energy of exhaust gas discharged from an internal combustion engine 10 (engine) to compress a fluid (e.g., air). As shown in FIG. 1, the turbocharger 1 (exhaust turbocharger 1A) includes a variable geometry turbine 2 and a centrifugal compressor 3 configured to be driven by the variable geometry turbine 2.

As shown in FIG. 1, the turbocharger 1 includes a rotational shaft 11, a turbine rotor 21 disposed on one side (right side in FIG. 1) of the rotational shaft 11, an impeller 31 disposed on the other side (left side in FIG. 1) of the rotational shaft 11, a bearing 12 configured to rotatably support the rotational shaft 11, and a housing 13 configured to house these components (rotational shaft 11, turbine rotor 21, impeller 31, and bearing 12).

In the illustrated embodiment, the housing 13 includes a turbine housing 22 configured to house the turbine rotor 21, a compressor housing 32 configured to house the impeller 31, and a bearing housing 14 configured to house the bearing 12. The variable geometry turbine 2 includes the above-described turbine rotor 21, and the above-described turbine housing 22. The centrifugal compressor 3 includes the above-described impeller 31, and the above-described compressor housing 32.

Hereinafter, the extension direction of the axis LA of the rotational shaft 11 is defined as the axial direction X of the rotational shaft 11, and the direction perpendicular to the axis LA is defined as the radial direction Y. In the axial direction X, the side where the turbine rotor 21 is located with respect to the impeller 31 is defined as the turbine side XT, and the side opposite the turbine side XT, i.e., where the impeller 31 is located with respect to the turbine rotor 21, is defined as the compressor side XC. Further, the outer side in the radial direction Y is also simply expressed as the outer peripheral side, and the inner side in the radial direction Y as the inner peripheral side.

The bearing housing 14 is disposed in the axial direction X between the turbine housing 22 and the compressor housing 32. The bearing 12 is disposed in the axial direction X between the turbine rotor 21 and the impeller 31 and is supported by the bearing housing 14. The bearing housing 14 may be fastened to each of the turbine housing 22 and the compressor housing 32 with fastening members (e.g., bolts) (not shown).

The compressor housing 32 has a gas introduction port 33 for introducing a gas to the inside, and a gas discharge port 34 for discharging the gas having passed through the impeller 31 to the outside. The gas introduction port 33 is formed in one end portion (end portion on the compressor side XC) of the turbocharger 1 in the axial direction X and opens toward the compressor side XC.

The compressor housing 32 internally has a gas introduction passage 35 for feeding the gas introduced from the outside of the compressor housing 32 through the gas introduction port 33 to the impeller 31, and a scroll passage 37 of spiral shape for discharging the gas having passed through the impeller 31 to the outside through the gas discharge port 34. The gas introduction passage 35 extends along the axial direction X. The scroll passage 37 is formed on the outer peripheral side of the impeller 31.

The compressor housing 32 has a gas introduction passage forming part 36 which forms the gas introduction passage 35 and a scroll passage forming part 38 which forms the scroll passage 37. The gas introduction port 33 is formed at the upstream end of the gas introduction passage forming part 36, and the gas discharge port 34 is formed at the downstream end of the scroll passage forming part 38. The impeller 31 is configured to guide the gas introduced from the compressor side XC along the axial direction X to the outer side in the radial direction Y.

The turbine housing 22 has an exhaust gas introduction port 23 for introducing an exhaust gas to the inside, and an exhaust gas discharge port 24 for discharging the exhaust gas having passed through the turbine rotor 21 to the outside. The exhaust gas discharge port 24 is formed in the other end portion (end portion on the turbine side XT) of the turbocharger 1 in the axial direction X and opens toward the turbine side XT.

The turbine housing 22 internally has a scroll passage 25 of spiral shape for feeding the exhaust gas introduced from the outside of the turbine housing 22 through the exhaust gas introduction port 23 to the turbine rotor 21, and an exhaust gas discharge passage 27 for discharging the exhaust gas having passed through the turbine rotor 21 to the outside through the exhaust gas discharge port 24. The exhaust gas discharge passage 27 extends along the axial direction X. The scroll passage 25 is disposed on the outer peripheral side of the turbine rotor 21.

The turbine housing 22 has a scroll passage forming part 26 which forms the scroll passage 25 and an exhaust gas discharge passage forming part 28 which forms the exhaust gas discharge passage 27. The exhaust gas discharge port 24 is formed at the downstream end of the exhaust gas discharge passage forming part 28. The turbine rotor 21 is configured to guide the exhaust gas introduced from the outer side in the radial direction Y to the turbine side XT along the axial direction X.

The turbocharger 1 includes a gas line 15 for directing the gas from the centrifugal compressor 3 to the internal combustion engine 10, and an exhaust gas line 16 for directing the exhaust gas from the internal combustion engine 10 to the variable geometry turbine 2. The gas line 15 includes a conduit 151 connected at one side to the internal combustion engine 10 and at the other side to the gas discharge port 34 of the centrifugal compressor 3. The exhaust gas line 16 includes a conduit 161 connected at one side to the internal combustion engine 10 and at the other side to the exhaust gas introduction port 23 of the variable geometry turbine 2.

The gas having passed through the impeller 31 and the scroll passage 37 of the centrifugal compressor 3 is led to the internal combustion engine 10 (engine) through gas line 15 and is used for combustion in the internal combustion engine 10. The exhaust gas produced by combustion in the internal combustion engine 10 is led through the exhaust gas line 16 and the scroll passage 25 of the variable geometry turbine 2 to the turbine rotor 21.

The turbocharger 1 is configured to rotate the turbine rotor 21 by energy of exhaust gas discharged from the internal combustion engine 10. Since the impeller 31 is mechanically connected to the turbine rotor 21 via the rotational shaft 11, the impeller 31 rotates in conjunction with the rotation of the turbine rotor 21. The turbocharger 1 is configured to compress the gas passing through the impeller 31 by rotation of the impeller 31 to increase the density of the gas and supply it to the internal combustion engine 10.

(Variable Geometry Turbine)

Figure 2:
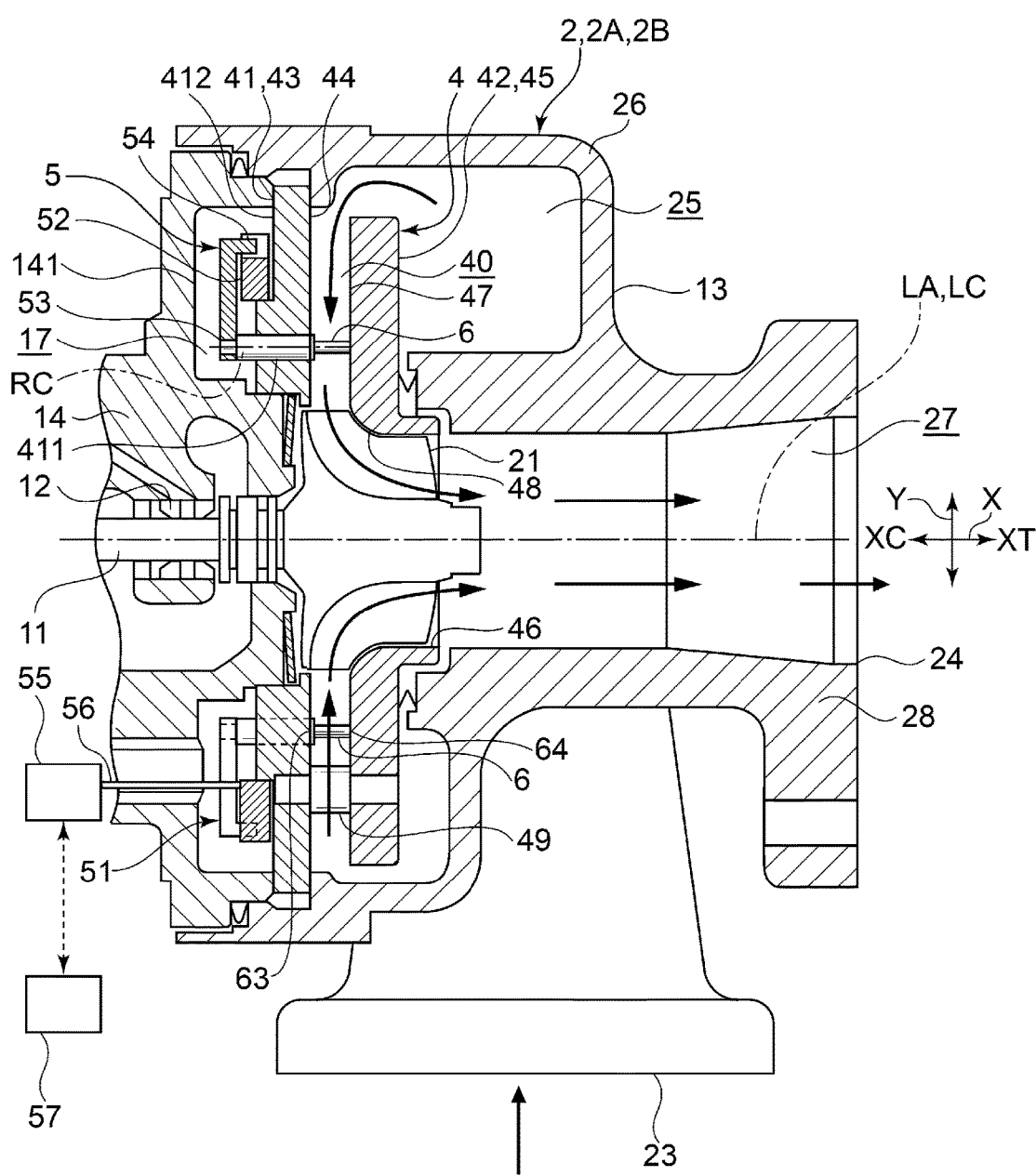
FIG. 2 is a schematic cross-sectional view of a turbine side of a turbocharger including a variable geometry turbine according to an embodiment of the present disclosure.

FIG. 2 is a schematic cross-sectional view of a turbine side of a turbocharger including a variable geometry turbine according to an embodiment of the present disclosure. In FIG. 2, the turbocharger 1 is shown in a schematic cross-section along the axis LA of the rotational shaft 11.

As shown in FIG. 2, the variable geometry turbine 2 includes the above-described turbine rotor 21, the above-described scroll passage forming part 26 which forms the scroll passage 25 on the outer peripheral side of the turbine rotor 21, an exhaust gas passage forming part 4 which forms an exhaust gas passage (nozzle passage) 40 for introducing the exhaust gas from the scroll passage 25 to the turbine rotor 21, and a variable nozzle unit 5 for adjusting the flow of the exhaust gas in the exhaust gas passage 40. The exhaust gas passage 40 is formed between the scroll passage 25 and the turbine rotor 21 so as to surround the periphery (outer side in the radial direction Y) of the turbine rotor 21.

(Exhaust Gas Passage Forming Part)

As shown in FIG. 2, the exhaust gas passage forming part 4 includes a nozzle mount 41 fixed to the housing 13, and a nozzle plate 42 disposed on the turbine side XT of the nozzle mount 41 and defining the exhaust gas passage 40 between the nozzle mount 41 and the nozzle plate 42. Hereinafter, the compressor side XC in the exhaust gas passage 40 may also be referred to as the hub side, and the turbine side XT in the exhaust gas passage 40 as the shroud side.

The nozzle mount 41 includes an annular plate part 43 extending along the circumferential direction of the turbine rotor 21 on the outer peripheral side of the turbine rotor 21. The nozzle mount 41 has a hub-side passage surface 44 formed on the turbine side XT of the annular plate part 43. In the illustrated embodiment, the nozzle mount 41 is fixed to the housing 13 with the outer peripheral edge of the annular plate part 43 interposed between the turbine housing 22 and the bearing housing 14.

The nozzle plate 42 includes an annular plate part 45 extending along the circumferential direction of the turbine rotor 21 on the outer peripheral side of the turbine rotor 21, and a protruding part 46 protruding from the inner peripheral edge of the annular plate part 45 to the turbine side XT along the axial direction X. The nozzle plate 42 has a shroud-side passage surface 47 formed on the compressor side XC of the annular plate part 45, and a shroud surface 48 connected to the shroud-side passage surface 47 and curved convexly. The shroud surface 48 is formed on the inner peripheral edge of the annular plate part 45, and a gap (clearance) is formed between the shroud surface 48 and the blade tip of the turbine rotor 21. The exhaust gas passage 40 is defined between the hub-side passage surface 44 and the shroud-side passage surface 47. Each of the hub-side passage surface 44 and the shroud-side passage surface 47 extends along a direction intersecting (for example, perpendicular to) the axis LA of the rotational shaft 11. The shroud-side passage surface 47 is disposed on the turbine side XT of the hub-side passage surface 44 and faces the hub-side passage surface 44.

The exhaust gas passage forming part 4 may further include at least one nozzle support 49 which supports the nozzle mount 41 and the nozzle plate 42 at a distance from each other. The at least one nozzle support 49 is fixed at one side to the annular plate part 43 of the nozzle mount 41 and fixed at the other side to the annular plate part 45 of the nozzle plate 42. The nozzle plate 42 is supported by the at least one nozzle support 49 at a distance from the nozzle mount 41 in the axial direction X. In the illustrated embodiment, the at least one nozzle support 49 includes a plurality of nozzle supports 49 arranged at intervals in the circumferential direction of the turbine rotor 21. That is, the exhaust gas passage forming part 4 includes a plurality of nozzle supports 49.

The exhaust gas introduced into the turbine housing 22 passes through the scroll passage 25 and then through the exhaust gas passage 40, and is led to the turbine rotor 21 to rotate the turbine rotor 21. After passing through the turbine rotor 21, the exhaust gas passes through the exhaust gas discharge passage 27, and is discharged out of the turbine housing 22 through the exhaust gas discharge port 24.

(Variable Nozzle Unit)

As shown in FIG. 2, the variable nozzle unit 5 includes a plurality of nozzle vanes 6 disposed in the exhaust gas passage 40 at intervals in the circumferential direction of the turbine rotor 21, and a rotation mechanism part 51 configured to rotate the plurality of nozzle vanes 6 about their respective rotation centers RC. The variable nozzle unit 5 can adjust the flow-path cross-sectional area of the exhaust gas passage 40 by changing the blade angle of the plurality of nozzle vanes arranged in the exhaust gas passage 40 with the rotation mechanism part 51. The variable geometry turbine 2 can change the flow velocity and the pressure of exhaust gas introduced into the turbine rotor 21 by increasing or decreasing the flow-path cross-sectional area of the exhaust gas passage 40 with the variable nozzle unit 5, thereby controlling the boost pressure of the variable geometry turbine 2.

As shown in FIG. 2, the rotation mechanism part 51 includes an annular drive ring 52 disposed rotatably along the circumferential direction of the turbine rotor 21 with respect to the nozzle mount 41, a plurality of vane shafts 53, a plurality of lever plates 54, an actuator 55 configured to rotate the drive ring 52 about the axis LC, and a controller 57 (control device) configured to control the driving of a drive shaft 56 of the actuator 55 (that is, the amount of movement along the circumferential direction about the axis LC).

Figure 3:
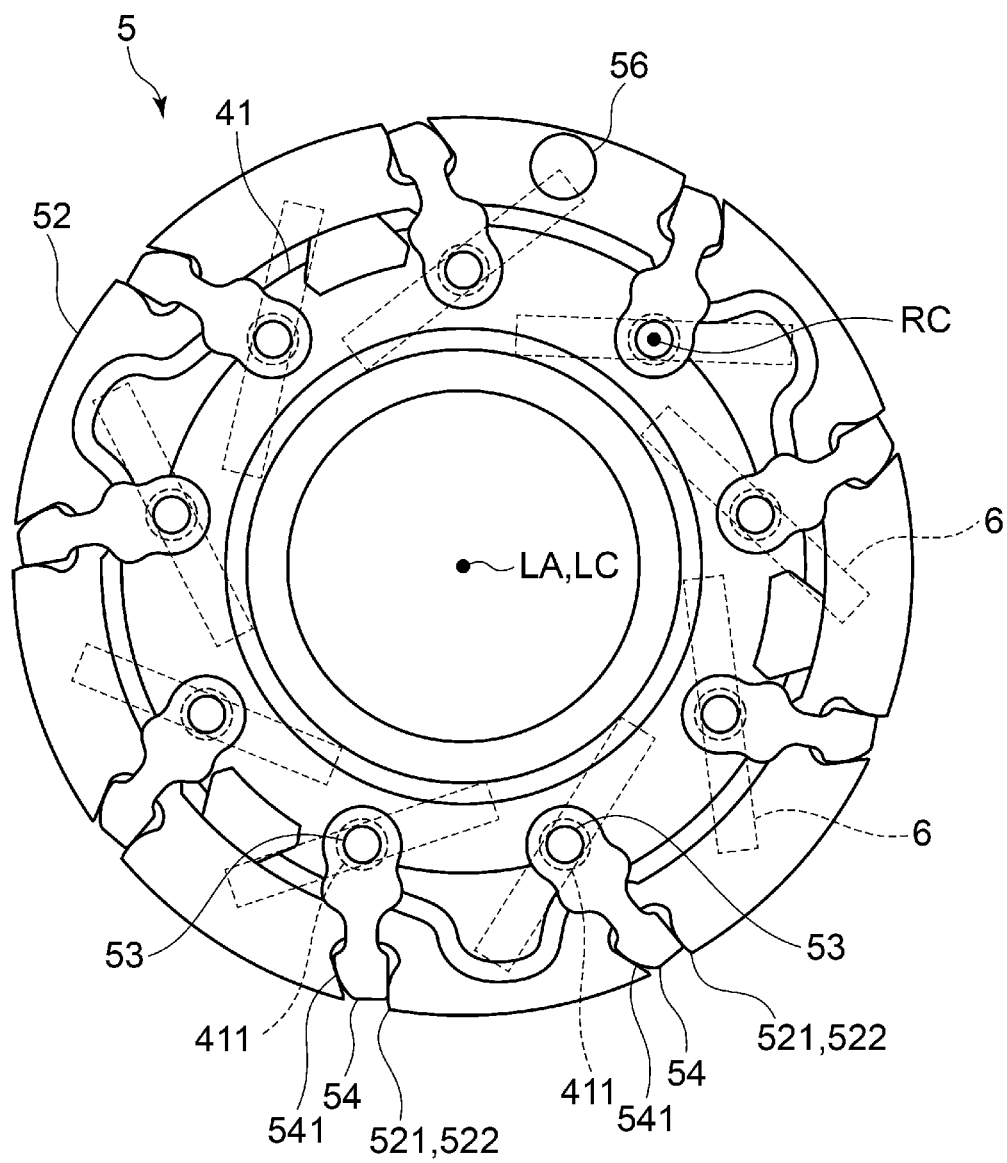
FIG. 3 is an explanatory diagram for describing a variable nozzle unit according to an embodiment of the present disclosure.

FIG. 3 is an explanatory diagram for describing a variable nozzle unit according to an embodiment of the present disclosure. FIG. 3 schematically shows the variable nozzle unit 5 as viewed from the compressor side XC in the axial direction X.

As shown in FIG. 3, the rotation mechanism part 51 includes the same number of vane shafts 53 and lever plates 54 as the nozzle vanes 6 included in the variable nozzle unit 5. Each vane shaft 53 is fixed at one side to the nozzle vane 6 and mechanically connected at the other side to the lever plate 54. The other side of the lever plate 54 is mechanically connected to the drive ring 52. The actuator 55 includes an electric motor, an air cylinder, or the like. The drive shaft 56 of the actuator 55 is mechanically connected to the drive ring 52.

Each of the lever plates 54 includes a fitting portion 541 fitted into a fitted portion 521 formed in the drive ring 52. The fitted portion 521 includes a groove portion 522 formed in an outer peripheral edge portion of the drive ring 52, and the fitting portion 541 is configured to be received in the groove portion 522 and loosely fit into the groove portion 522.

As shown in FIG. 3, the nozzle mount 41 has a plurality of insertion holes 411 formed at intervals along the circumferential direction around the axis LA. The nozzle mount 41 has the same number of insertion holes 411 as the nozzle vanes 6 included in the variable nozzle unit 5. Each of the vane shafts 53 is rotatably inserted through one of the insertion holes 411.

As shown in FIG. 2, an annular interior space 17 is formed by a back surface 412 of the annular plate part 43 of the nozzle mount 41 opposite (compressor side XC) the hub-side passage surface 44 and an annular groove portion 141 of the bearing housing 14 formed on the turbine side XT. The drive ring 52 and the plurality of lever plates 54 are accommodated in the interior space 17 formed inside the housing 13.

In the power transmission path from the actuator 55 to the plurality of nozzle vanes 6, the drive shaft 56 and the drive ring 52, the drive ring 52 and the lever plates 54, and the lever plates 54 and the vane shafts 53, are connected to each other. When the actuator 55 is driven by the controller 57, the drive ring 52 is rotated about the axis LC as the drive shaft 56 of the actuator 55 is moved. When the drive ring 52 is rotated, the nozzle vanes 6 are rotated about the respective rotation centers RC via the lever plates 54 and the vane shafts 53 in conjunction with the rotation of the drive ring 52 to change their blade angle.

When the drive ring 52 is rotated to one side in the circumferential direction, the circumferentially adjacent nozzle vanes 6 move in the direction away from each other, and the exhaust gas passage 40 between the nozzle vanes 6, i.e., the flow-path cross-sectional area of the exhaust gas passage 40, increases. When the drive ring 52 is rotated to the other side in the circumferential direction, the circumferentially adjacent nozzle vanes 6 move in the direction toward each other, and the exhaust gas passage 40 between the nozzle vanes 6, i.e., the flow-path cross-sectional area of the exhaust gas passage 40, decreases. The rotational direction that increases the flow-path cross-sectional area of the exhaust gas passage 40 is the open direction, and the rotational direction that decreases the flow-path cross-sectional area of the exhaust gas passage 40 is the closed direction.

Figure 4:
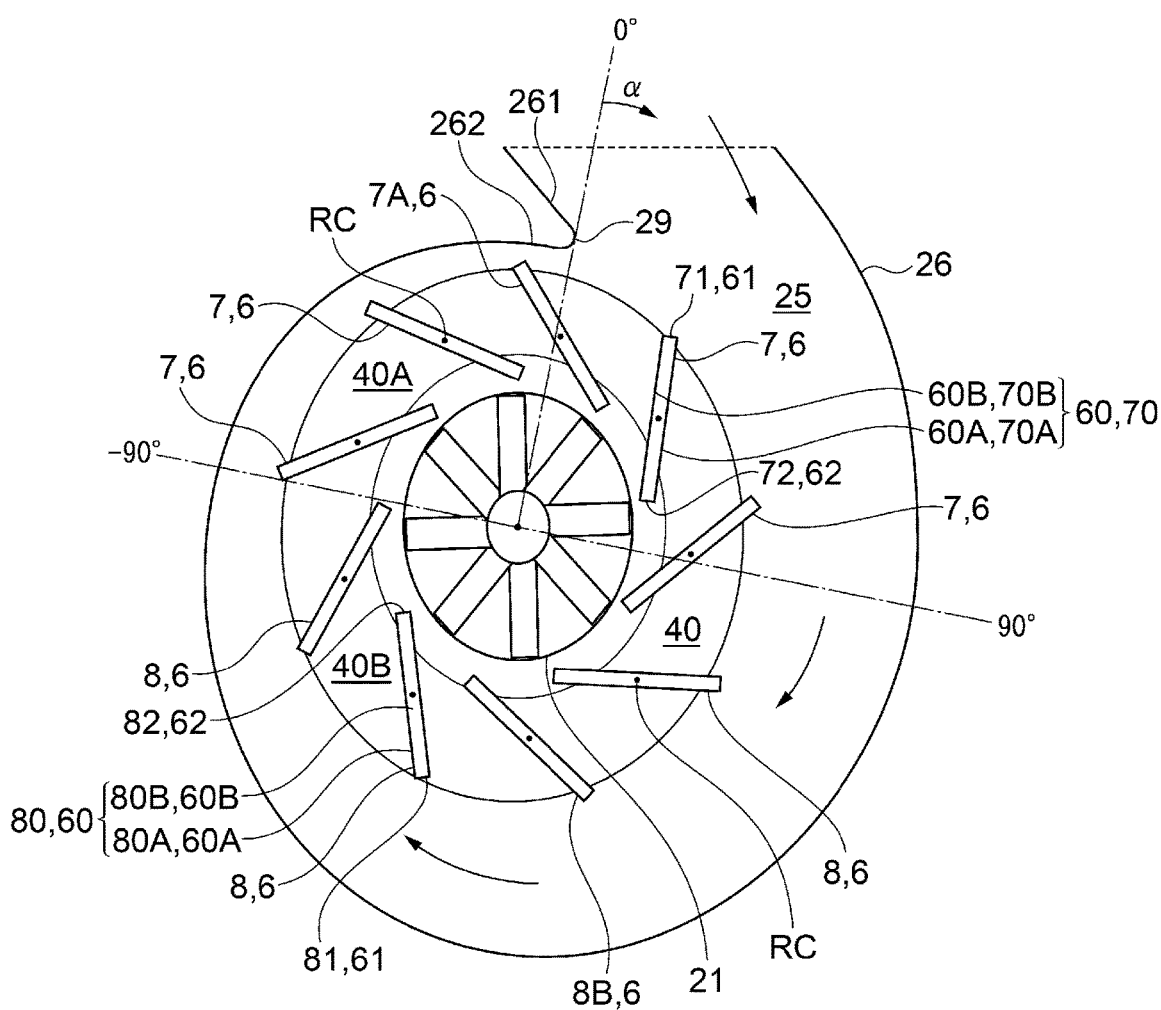
FIG. 4 is an explanatory diagram for describing the arrangement of nozzle vanes according to an embodiment.

FIG. 4 is an explanatory diagram for describing the arrangement of nozzle vanes according to an embodiment. FIG. 4 schematically shows the variable geometry turbine 2 as viewed from the turbine side XT in the axial direction X.

As shown in FIG. 4, each of the nozzle vanes 6 (7, 8) has a blade surface 60 (70, 80) including a pressure surface 60A (70A, 80A) which is one surface extending between a leading edge 61 (71, 81) and a trailing edge 62 (72, 82), and a suction surface 60B (70B, 80B) which is another surface extending between the leading edge 61 and the trailing edge 62. The suction surface 60B is disposed inward of the pressure surface 60A in the radial direction Y. The trailing edge 62 is disposed downstream of the leading edge 61 in the exhaust gas flow direction. The pressure surfaces 60A and the suction surfaces 60B of the plurality of nozzle vanes 6 may have curved shapes.

As shown in FIG. 2, each of the nozzle vanes 6 (7, 8) has a hub-side end 63 (73, 83) with a gap (clearance) from the hub-side passage surface 44 of the nozzle mount 41, and a shroud-side end 64 (74, 84) with a gap (clearance) from the shroud-side passage surface 47 of the nozzle plate 42.

The scroll passage forming part 26 has a tongue portion 29 protruding toward the scroll passage 25 in a plane viewed from one side (turbine side XT) in the axial direction X of the rotational shaft 11, as shown in FIG. 4. The tongue portion 29 represents a connection point between a winding start 261 and a winding end 262 of the scroll passage forming part 26.

As shown in FIG. 4, in a plane viewed from one side (e.g., turbine side XT) in the axial direction X of the rotational shaft 11, the exhaust gas passage 40 is divided into a near-tongue region 40A in the vicinity of the tongue portion 29 of the scroll passage 25 and a far-tongue region 40B which is a region other than the near-tongue region 40A. The near-tongue region 40A is set so as to include at least the nozzle vane 6 (7A) closest to the tongue portion 29, and the far-tongue region 40B is set so as to include at least the nozzle vane 6 (8B) farthest from the tongue portion 29.

The plurality of nozzle vanes 6 includes at least one near-tongue nozzle vane 7 disposed in the near-tongue region 40A and at least one far-tongue nozzle vane 8 disposed in the far-tongue region 40B. The near-tongue nozzle vane 7 includes the nozzle vane 7A, and the far-tongue nozzle vane 8 includes the nozzle vane 8B.

(Wear of Vane Shaft)

Figure 5:
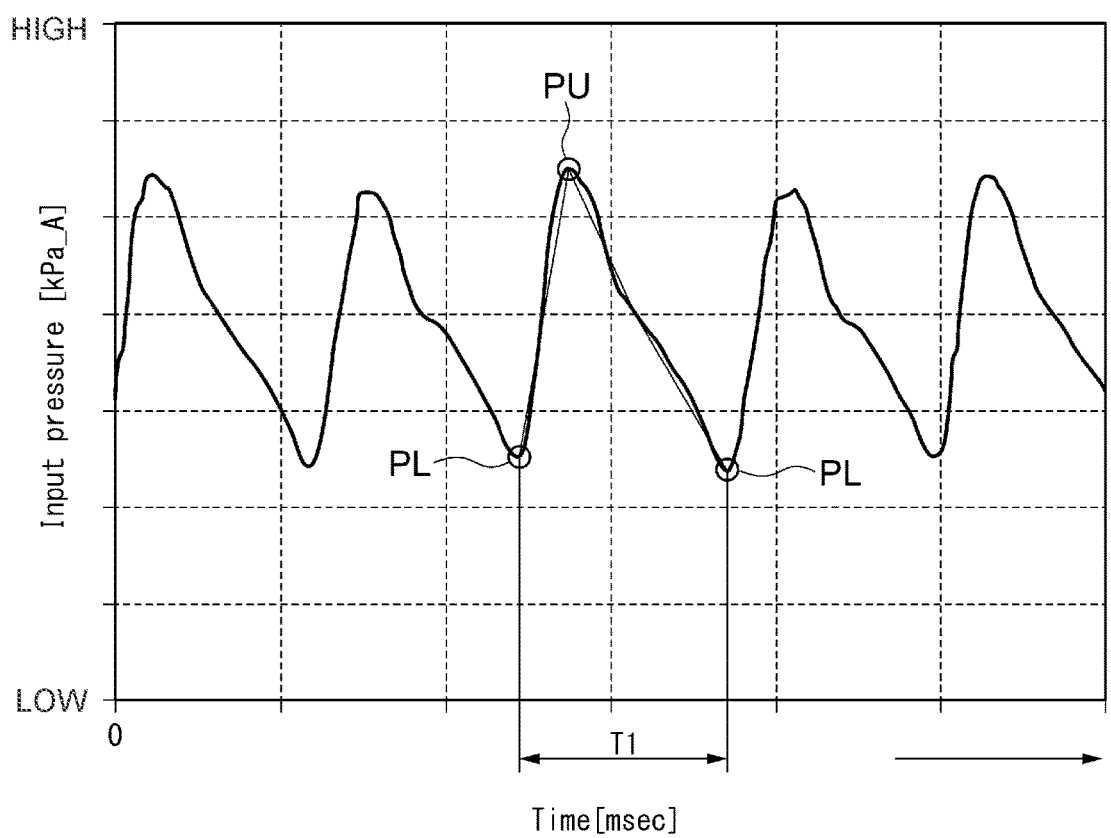
FIG. 5 is an explanatory diagram for describing CFD analysis conditions that simulate pulsation conditions of an internal combustion engine.

FIG. 5 is an explanatory diagram for describing CFD analysis conditions that simulate pulsation conditions of an internal combustion engine. As shown in FIG. 5, CFD analysis was performed to investigate the changes in the load acting on the nozzle vane 6 under pressure conditions that simulate the pulsation conditions of the internal combustion engine 10, where the inlet pressure of the variable geometry turbine 2 increases or decreases between the lower pressure limit PL and the upper pressure limit PU during one cycle T1 of the internal combustion engine 10.

Figure 6:
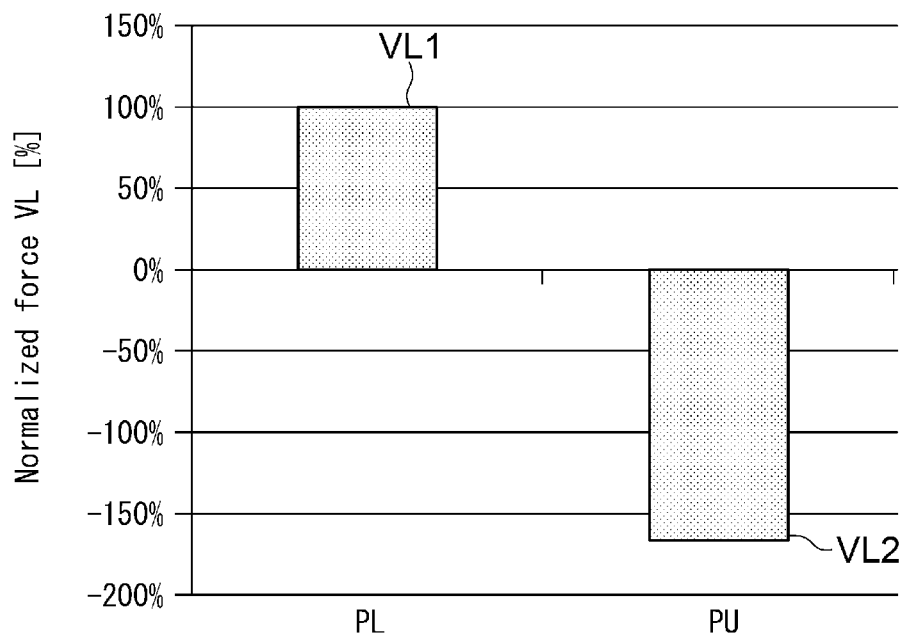
FIG. 6 is an explanatory diagram for describing load evaluation results of a near-tongue nozzle vane in a comparative example.
Figure 7:
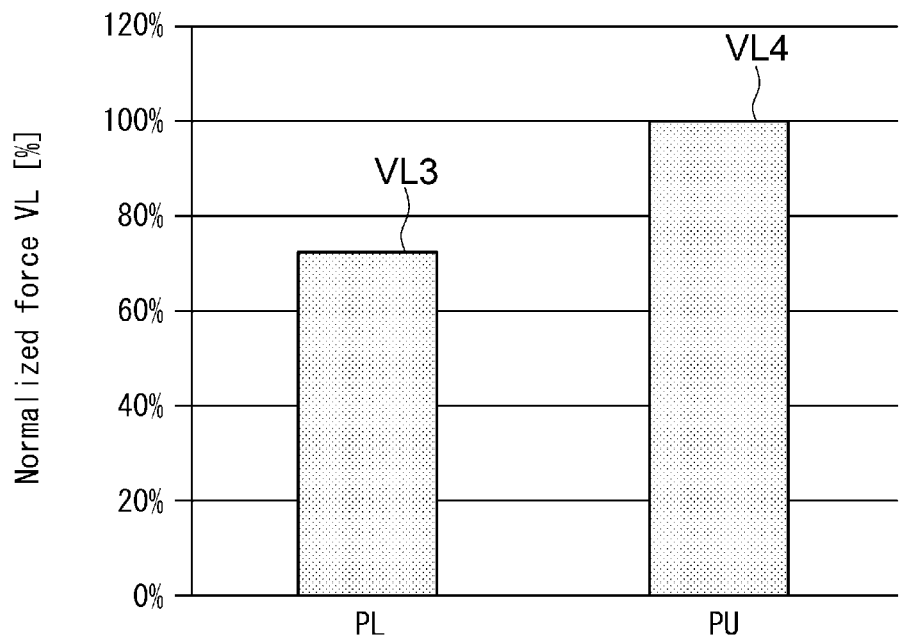
FIG. 7 is an explanatory diagram for describing load evaluation results of a far-tongue nozzle vane in a comparative example.
Figure 8:
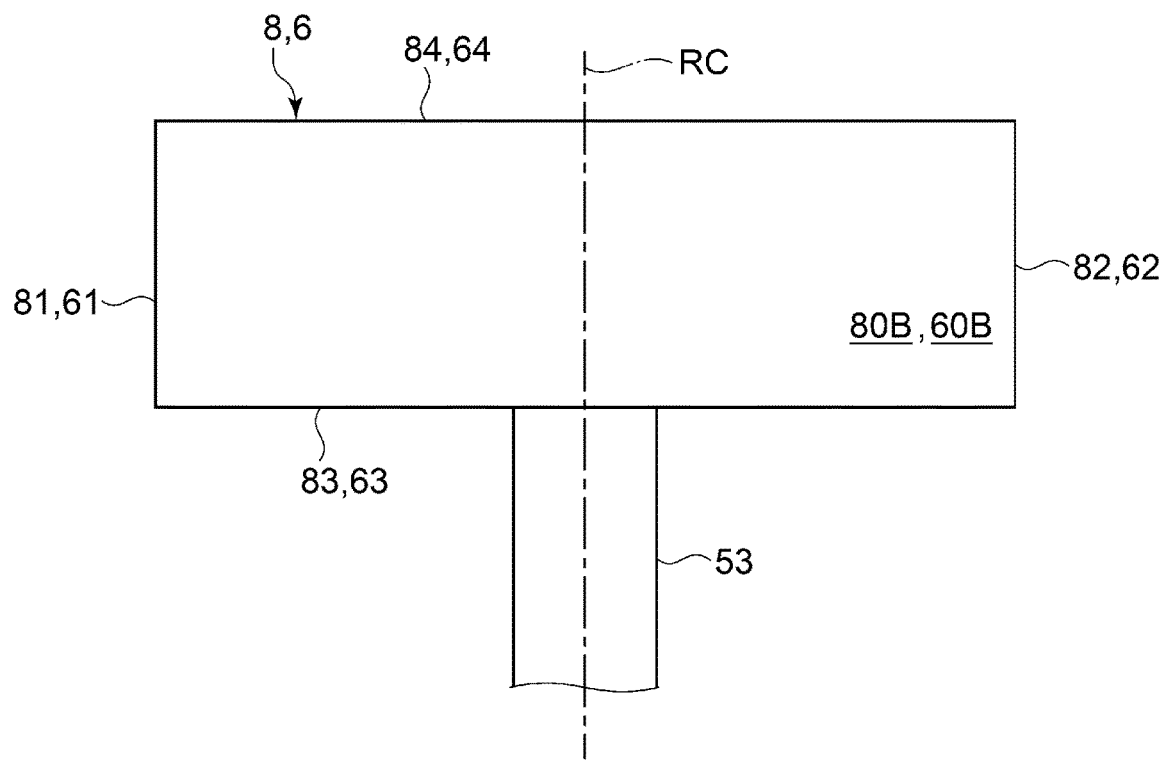
FIG. 8 is a diagram showing the suction surface of the far-tongue nozzle vane according to an embodiment.

FIG. 6 is an explanatory diagram for describing load evaluation results of a near-tongue nozzle vane in a comparative example. FIG. 7 is an explanatory diagram for describing load evaluation results of a far-tongue nozzle vane in a comparative example. FIG. 8 is a diagram showing the suction surface of the far-tongue nozzle vane according to an embodiment. The nozzle vanes subject to load evaluation in FIGS. 6 and 7 have the same shape as the nozzle vane 6 (far-tongue nozzle vane 8) shown in FIG. 8, and in plan view with the suction surface 60B (80B) as front, the leading edge 61 (81) and the trailing edge 62 (82) each extend linearly along the extension direction of the rotation center RC from the hub-side end 63 (83) to the shroud-side end 64 (84).

In FIGS. 6 and 7, the load VL acting on the nozzle vane is evaluated as a ratio to the maximum load in a given direction (positive direction) 100%. FIG. 6 shows the load VL1 acting on the nozzle vane 7A closest to the tongue portion 29 under a pressure condition of the lower pressure limit PL and the load VL2 acting on the nozzle vane 7A under a pressure condition of the upper pressure limit PU. The direction of action of the load VL2 is reversed from that of the load VL1. FIG. 7 shows the load VL3 acting on the nozzle vane 8B farthest from the tongue portion 29 under a pressure condition of the lower pressure limit PL and the load VL4 acting on the nozzle vane 7A under a pressure condition of the upper pressure limit PU. The load VL4 acts in the same direction as the load VL3, and the direction of action is not reversed. Thus, unlike the far-tongue nozzle vane 8 (8B), the near-tongue nozzle vane 7 (7A) may experience a reversal of the direction of action of the load on the near-tongue nozzle vane 7 due to pressure fluctuations in the exhaust gas passage 40 during one pulsation cycle of the internal combustion engine 10. If the direction of action of the load on the nozzle vane 6 is reversed in a short period of time, about one pulsation cycle of the internal combustion engine 10, the risk of wear of the vane shaft 53 fixed to this nozzle vane 6 may increase.

(Notch)

As a result of intensive studies, the present inventors found that the load acting on the leading edge and trailing edge sides of the near-tongue nozzle vane 7 changes significantly due to pressure fluctuations in the exhaust gas passage 40 during one cycle of pulsation of the internal combustion engine 10, and that the change in load on the leading edge and trailing edge sides is one of the causes of the reversal of the direction of action of the load on the near-tongue nozzle vane 7.

Figure 9:
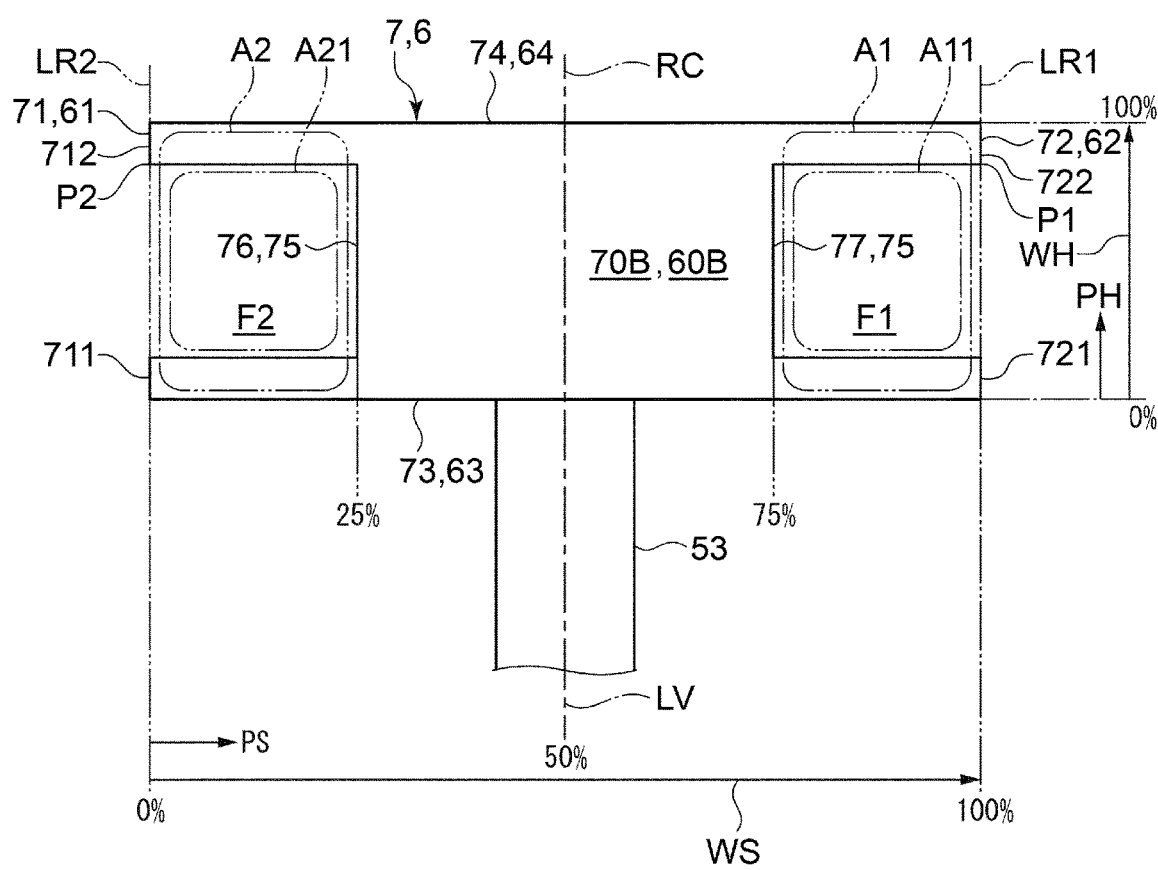
FIG. 9 is a diagram showing the suction surface of the near-tongue nozzle vane according to an embodiment.
Figure 10:
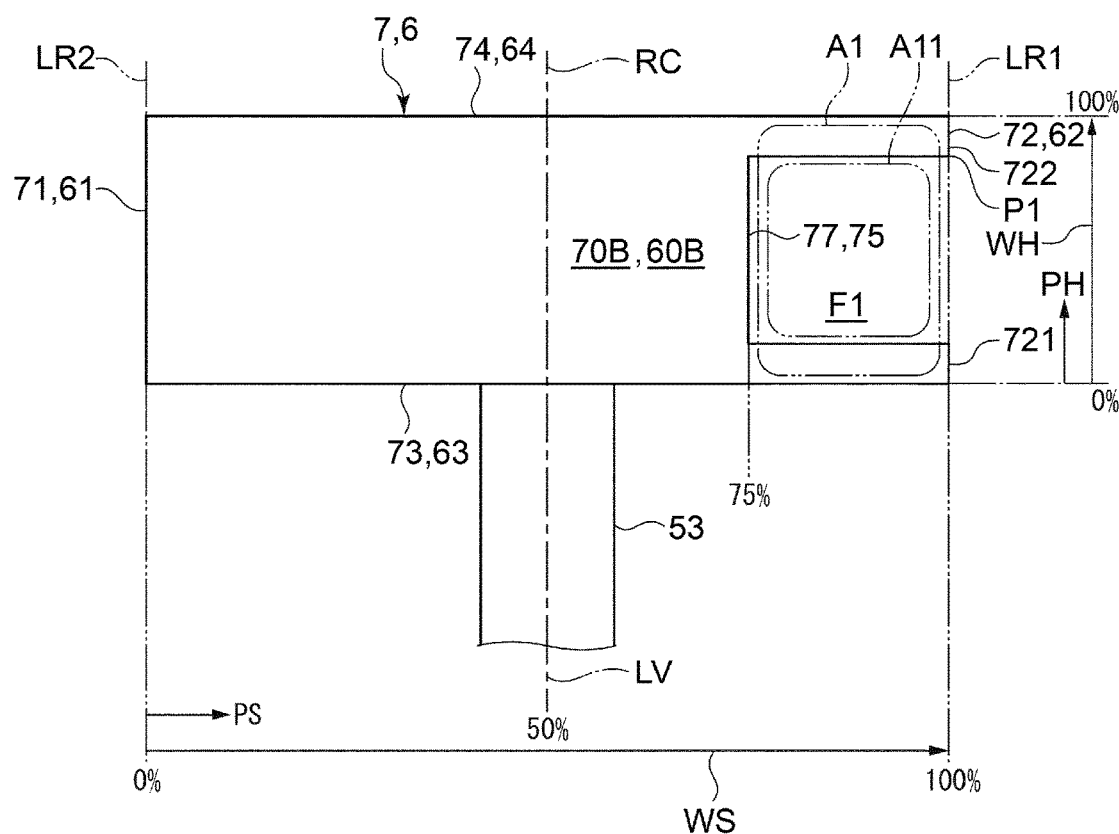
FIG. 10 is a diagram showing the suction surface of the near-tongue nozzle vane according to an embodiment.
Figure 11:
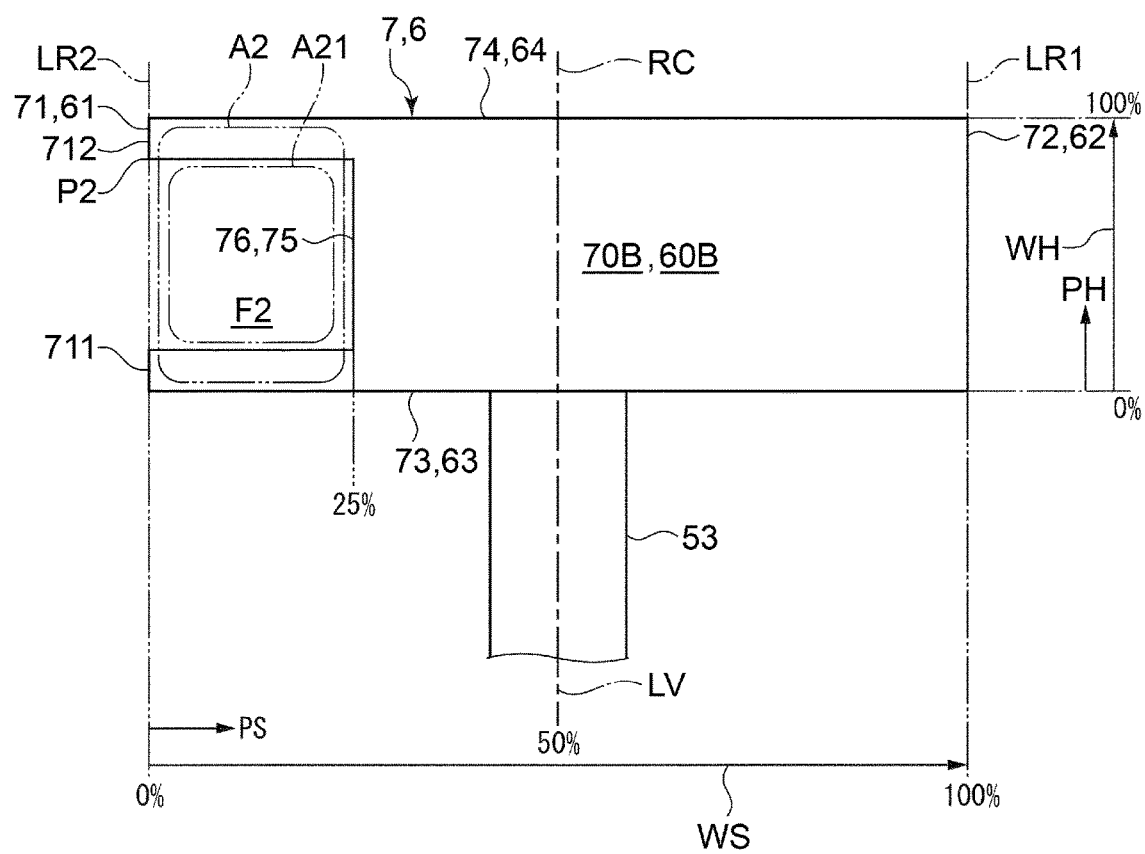
FIG. 11 is a diagram showing the suction surface of the near-tongue nozzle vane according to an embodiment.

FIGS. 9 to 11 are each a diagram showing the suction surface of the near-tongue nozzle vane according to an embodiment.

As shown in FIG. 2, the variable geometry turbine 2 (2A) according to some embodiments includes the above-described turbine rotor 21, the above-described scroll passage forming part 26 which forms the scroll passage 25, the above-described exhaust gas passage forming part 4 which forms the exhaust gas passage 40, and the above-described variable nozzle unit 5 including the plurality of nozzle vanes 6 and the rotation mechanism part 51. As shown in FIG. 4, the plurality of nozzle vanes 6 includes at least one near-tongue nozzle vane 7 disposed in the near-tongue region 40A and at least one far-tongue nozzle vane 8 disposed in the far-tongue region 40B. As shown in FIGS. 9 to 11, at least one near-tongue nozzle vane 7 of the variable geometry turbine 2 (2A) has, in at least one of the leading edge 71 or the trailing edge 72 of the near-tongue nozzle vane 7, a notch 75 that is cut out to a greater extent than the leading edge 81 or the trailing edge 82 of the far-tongue nozzle vane 8.

In the embodiment shown in FIG. 9, all near-tongue nozzle vanes 7 disposed in the near-tongue region 40A have leading edge-side notches 76 which are notches 75 formed in the leading edges 71 and trailing edge-side notches 77 which are notches 75 formed in the trailing edges 72.

In the embodiment shown in FIG. 10, all near-tongue nozzle vanes 7 disposed in the near-tongue region 40A have trailing edge-side notches 77, but notches 75 (leading edge-side notches 76) are not formed in the leading edges 71. In plan view with the suction surface 70B as front, as shown in FIG. 10, the leading edge 71 extends linearly along the extension direction of the rotation center RC from the hub-side end 73 to the shroud-side end 74.

In the embodiment shown in FIG. 11, all near-tongue nozzle vanes 7 disposed in the near-tongue region 40A have leading edge-side notches 76, but notches 75 (trailing edge-side notches 77) are not formed in the trailing edges 72. In plan view with the suction surface 70B as front, as shown in FIG. 11, the trailing edge 72 extends linearly along the extension direction of the rotation center RC from the hub-side end 73 to the shroud-side end 74.

Figure 12:
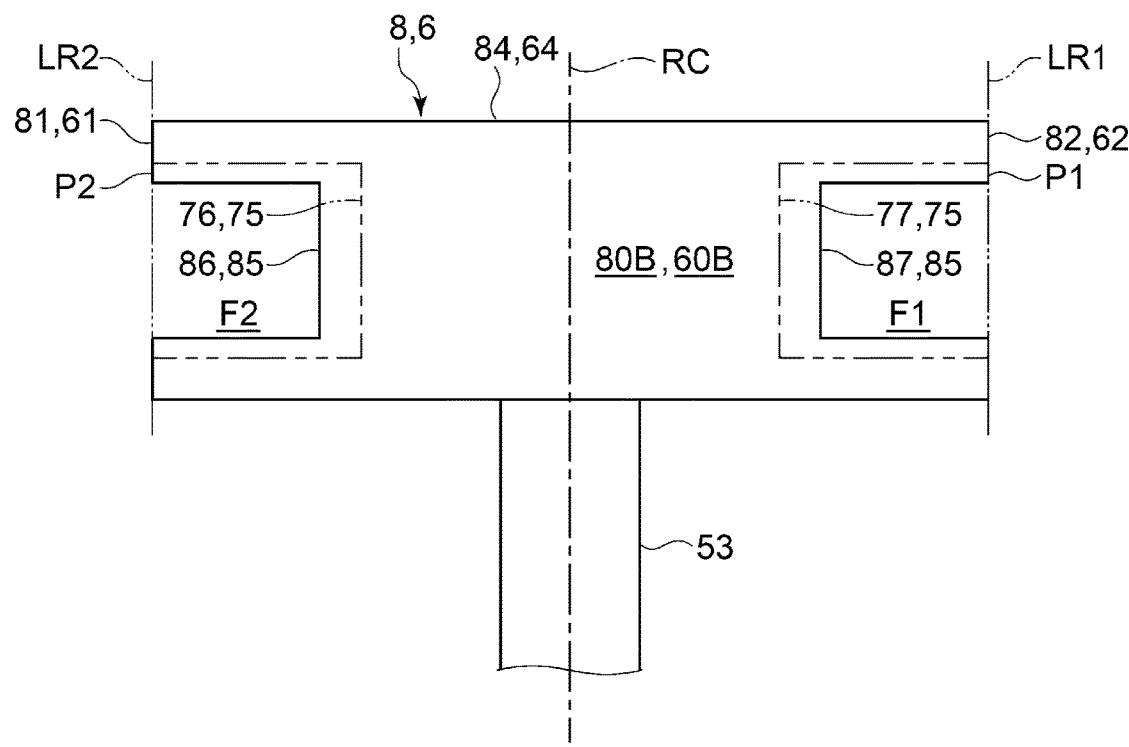
FIG. 12 is a diagram showing the suction surface of the far-tongue nozzle vane according to an embodiment.

FIG. 12 is a diagram showing the suction surface of the far-tongue nozzle vane according to an embodiment.

As shown in FIG. 8, all far-tongue nozzle vanes 8 disposed in the far-tongue region 40B does not have to have notches 85 in both the leading edges 81 and the trailing edges 82. Further, at least one far-tongue nozzle vane 8 disposed in the far-tongue region 40B may have at least one of a leading edge-side notch 86 which is a notch 85 formed in the leading edge 81 or a trailing edge-side notch 87 which is a notch 85 formed in the trailing edge 82, as shown in FIG. 12. In the embodiment shown in FIG. 12, at least one far-tongue nozzle vane 8 has both the leading edge-side notch 86 and the trailing edge-side notch 87.

In FIG. 12, the notch 75 (leading edge-side notch 76 and trailing edge-side notch 77) of the near-tongue nozzle vane 7 is shown by the dashed two-dotted line to compare the size of the notch 75 and the notch 85. As shown in FIG. 12, the leading edge-side notch 76 of the near-tongue nozzle vane 7 is cut out to a greater extent than the leading edge-side notch 86 of the far-tongue nozzle vane 8. The trailing edge-side notch 77 of the near-tongue nozzle vane 7 is cut out to a greater extent than the trailing edge-side notch 87 of the far-tongue nozzle vane 8.

The size of the trailing edge-side notches 77, 87 may be determined by, in plan view with the suction surface 60B as front, as shown in FIG. 12, comparing the areas F1 determined from the total lengths of the trailing edge-side notches 77, 87 in the blade length direction from the line LR1 that is parallel to the rotation center RC and passes through the trailing edge point P1 on the trailing edge 62 with the maximum shortest distance from the rotation center RC.

Further, the size of the leading edge-side notches 76, 86 may be determined by, in plan view with the suction surface 60B as front, as shown in FIG. 12, comparing the areas F2 determined from the total lengths of the leading edge-side notches 76, 86 in the blade length direction from the line LR2 that is parallel to the rotation center RC and passes through the leading edge point P2 on the leading edge 61 with the maximum shortest distance from the rotation center RC. Also, the size of the leading edge-side notch 76, 86 and the trailing edge-side notch 77, 87 may be determined by comparing the area F2 and the area F1.

Figure 13:
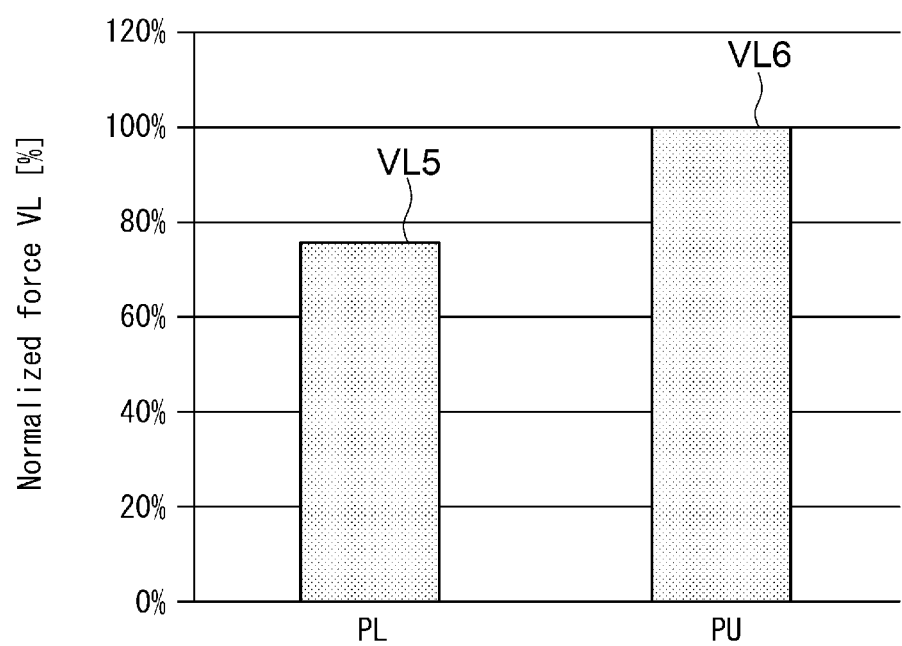
FIG. 13 is an explanatory diagram for describing load evaluation results of the near-tongue nozzle vane shown in FIG. 9.

FIG. 13 is an explanatory diagram for describing load evaluation results of the near-tongue nozzle vane shown in FIG. 9. In FIG. 13, the load VL acting on the nozzle vane is evaluated as a ratio to the maximum load in a given direction (positive direction) 100%. It shows the load VL5 acting on the near-tongue nozzle vane 7 (7A) having the notch 75 under a pressure condition of the lower pressure limit PL and the load VL6 acting on the nozzle vane 7 (7A) under a pressure condition of the upper pressure limit PU. The load VL6 acts in the same direction as the load VL5, and the direction of action is not reversed. By providing the notch 75 in the near-tongue nozzle vane 7 (7A), the portion where fluid force from the exhaust gas flowing in the exhaust gas passage 40 acts can be selectively removed. Thus, it is possible to suppress the reversal of the direction of action of the load on the near-tongue nozzle vane 7.

With the above configuration, by providing the notch 75 in at least one of the leading edge 71 or the trailing edge 72 of the near-tongue nozzle vane 7, the portion where fluid force from the exhaust gas flowing in the exhaust gas passage 40 acts can be selectively removed, so that the reversal of the direction of action of the load on the near-tongue nozzle vane 7 can be suppressed. By suppressing the reversal of the direction of action of the load on the near-tongue nozzle vane 7, it is possible to reduce the number of times the vane shaft 53 fixed to the near-tongue nozzle vane 7 collides with another part (nozzle mount 41), thereby suppressing the wear of the vane shaft 53.

(Trailing Edge-Side Notch)

In some embodiments, as shown in FIGS. 9 and 10, when the blade length position PS, in the blade length direction WS from the leading edge 71 to the trailing edge 72 of the near-tongue nozzle vane 7, of the leading edge 71 is 0%, and the blade length position PS of the trailing edge 72 in the blade length direction WS is 100%, at least a portion of the trailing edge-side notch 77 is formed in a region A1 within a range where the blade length position PS is 75% or more and 100% or less.

The region A1 is preferably within a range where the blade length position PS is 75% or more and 90% or less, more preferably within a range where the blade length position PS is 75% or more and 80% or less. In other words, the trailing edge-side notch 77 is preferably formed up to the blade length position PS of 90% or less, more preferably up to the blade length position PS of 80% or less. In the embodiments shown in FIGS. 9 and 10, at least a portion of the trailing edge-side notch 77 is formed over a range where the blade length position PS is between 75% and 100%.

With the above configuration, in the trailing edge portion (a range where the blade length position is 75% or more and 100% or less) of the near-tongue nozzle vane 7, the load changes significantly due to pressure fluctuations in the exhaust gas passage 40 during one cycle of pulsation of the internal combustion engine 10, and the change in load on the trailing edge portion is one of the causes of the reversal of the direction of action of the load on the near-tongue nozzle vane 7. Therefore, by forming at least a portion of the trailing edge-side notch 77 in the trailing edge portion of the near-tongue nozzle vane 7, i.e., in the region A1 within a range where the blade length position is 75% or more and 100% or less, the reversal of the direction of action of the load on the near-tongue nozzle vane 7 can be effectively suppressed.

In some embodiments, as shown in FIGS. 9 and 10, when the blade height position PH, in the blade height direction WH from the hub-side end 73 to the shroud-side end 74 of the near-tongue nozzle vane 7, of the hub-side end 73 is 0%, and the blade height position PH of the shroud-side end 74 in the blade height direction WH is 100%, at least a portion of the trailing edge-side notch 77 is formed in a region A11 of the region A1 where the blade height position PH is 15% or more and 85% or less.

The region A11 preferably includes a range of the region A1 where the blade height position PH is between 40% and 60%, more preferably includes a range of the region A1 where the blade height position PH is between 20% and 80%. In the embodiments shown in FIGS. 9 and 10, at least a portion of the trailing edge-side notch 77 is formed over a range where the blade length position PS is between 75% and 100% and a range where the blade height position PH is between 15% and 85%.

With the above configuration, in the height middle portion (a range where the blade height position is 15% or more and 85% or less) on the trailing edge side of the near-tongue nozzle vane 7, the load changes significantly due to pressure fluctuations in the exhaust gas passage 40 during one cycle of pulsation of the internal combustion engine 10, and the change in load on the height middle portion on the trailing edge side is one of the causes of the reversal of the direction of action of the load on the near-tongue nozzle vane 7. Therefore, by forming at least a portion of the trailing edge-side notch 77 in the height middle portion on the trailing edge side of the near-tongue nozzle vane 7, i.e., in the region A11 within a range where the blade height position is 15% or more and 85% or less, the reversal of the direction of action of the load on the near-tongue nozzle vane 7 can be effectively suppressed.

(Leading Edge-Side Notch)

In some embodiments, as shown in FIGS. 9 and 11, at least a portion of the leading edge-side notch 76 is formed in a region A2 within a range where the blade length position PS is 0% or more and 25% or less.

The region A2 is preferably within a range where the blade length position PS is 10% or more and 25% or less, more preferably within a range where the blade length position PS is 20% or more and 25% or less. In other words, the leading edge-side notch 76 is preferably formed up to the blade length position PS of 10% or more, more preferably up to the blade length position PS of 20% or more. In the embodiments shown in FIGS. 9 and 11, at least a portion of the leading edge-side notch 76 is formed over a range where the blade length position PS is between 0% and 25%.

With the above configuration, in the leading edge portion (a range where the blade length position is 0% or more and 25% or less) of the near-tongue nozzle vane 7, the load changes significantly due to pressure fluctuations in the exhaust gas passage 40 during one cycle of pulsation of the internal combustion engine 10, and the change in load on the leading edge portion is one of the causes of the reversal of the direction of action of the load on the near-tongue nozzle vane 7. Therefore, by forming at least a portion of the leading edge-side notch 76 in the leading edge portion of the near-tongue nozzle vane 7, i.e., in the region A2 within a range where the blade length position is 0% or more and 25% or less, the reversal of the direction of action of the load on the near-tongue nozzle vane 7 can be effectively suppressed.

In some embodiments, as shown in FIGS. 9 and 11, at least a portion of the leading edge-side notch 76 is formed in a region A21 of the region A2 where the blade height position PH is 15% or more and 85% or less.

The region A21 preferably includes a range of the region A2 where the blade height position PH is between 40% and 60%, more preferably includes a range of the region A2 where the blade height position PH is between 20% and 80%. In the embodiments shown in FIGS. 9 and 11, at least a portion of the leading edge-side notch 76 is formed over a range where the blade length position PS is between 0% and 25% and a range where the blade height position PH is between 15% and 85%.

With the above configuration, in the height middle portion (a range where the blade height position is 15% or more and 85% or less) on the leading edge side of the near-tongue nozzle vane 7, the load changes significantly due to pressure fluctuations in the exhaust gas passage 40 during one cycle of pulsation of the internal combustion engine 10, and the change in load on the height middle portion on the leading edge side is one of the causes of the reversal of the direction of action of the load on the near-tongue nozzle vane 7. Therefore, by forming at least a portion of the leading edge-side notch 76 in the height middle portion on the leading edge side of the near-tongue nozzle vane 7, i.e., in the region A21 within a range where the blade height position is 15% or more and 85% or less, the reversal of the direction of action of the load on the near-tongue nozzle vane 7 can be effectively suppressed.

(Size Relationship Between Leading Edge-Side Notch and Trailing Edge-Side Notch)

In some embodiments, as shown in FIG. 9, at least one near-tongue nozzle vane 7 of the variable geometry turbine 2 (2A) is configured such that the leading edge-side notch 76 and the trailing edge-side notch 77 have the same size. In an embodiment, the area F2 of the leading edge-side notch 76 is equal to the area F1 of the trailing edge-side notch 77.

In the illustrated embodiment, the leading edge-side notch 76 and the trailing edge-side notch 77 are configured to be line symmetrical with respect to the virtual line LV that satisfies the 50% blade length position PS in plan view with the suction surface 60B as front, as shown in FIG. 9.

With the above configuration, in the variable geometry turbine 2, a high-speed flow enters from the upstream side of the nozzle vane 6, and the nozzle vane 6 is subjected to fluid force by the surrounding flow. Therefore, the torque around the rotation center RC applied to the nozzle vane 6 should be small in order to maintain the nozzle vane 6 at a predetermined angle. By making the leading edge-side notch 76 and the trailing edge-side notch 77 of the near-tongue nozzle vane the same size, the fluid force applied to both the leading edge side and the trailing edge side of the near-tongue nozzle vane 7 can be equalized, so that the torque around the rotation center RC applied to the near-tongue nozzle vane can be reduced. The rotation center RC may be located on the leading edge side of the virtual line LV or on the trailing edge side of the virtual line LV.

Figure 14:
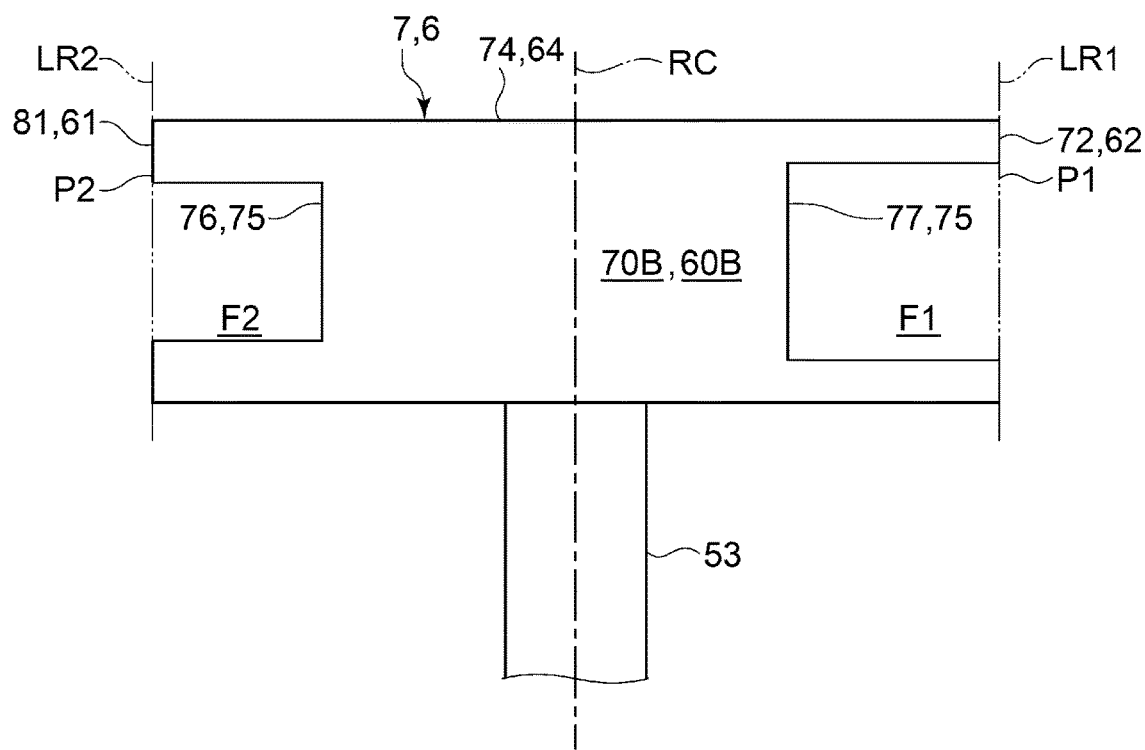
FIG. 14 is a diagram showing the suction surface of the near-tongue nozzle vane according to an embodiment.

FIG. 14 is a diagram showing the suction surface of the near-tongue nozzle vane according to an embodiment.

In some embodiments, as shown in FIG. 14, at least one near-tongue nozzle vane 7 of the variable geometry turbine 2 (2A) is configured such that the trailing edge-side notch 77 is larger than the leading edge-side notch 76. In an embodiment, the area F1 of the trailing edge-side notch 77 is larger than the area F2 of the leading edge-side notch 76.

With the above configuration, the trailing edge-side notch 77 is more effective than the leading edge-side notch 76 in suppressing the reversal of the direction of action of the load on the near-tongue nozzle vane 7. Therefore, by making the trailing edge-side notch 77 larger than the leading edge-side notch 76 of the near-tongue nozzle vane 7, the reversal of the direction of action of the load on the near-tongue nozzle vane 7 can be effectively suppressed.

Figure 15:
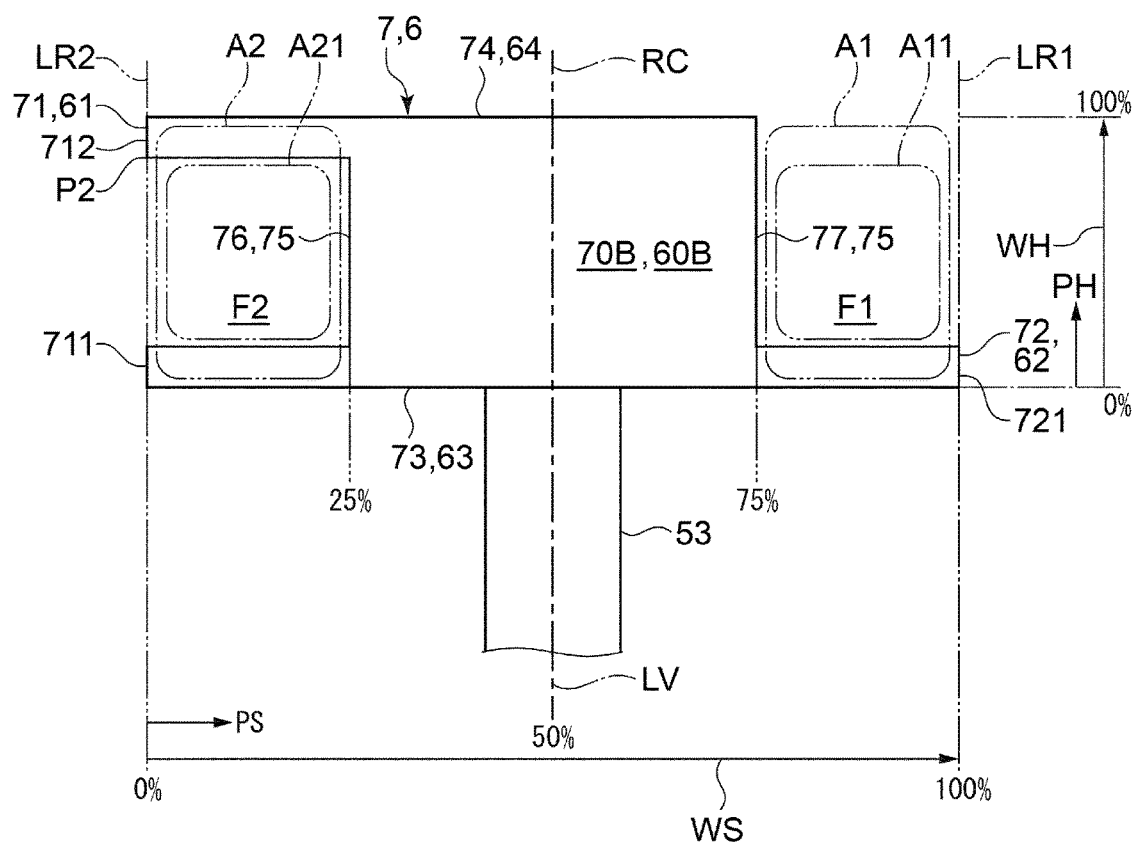
FIG. 15 is a diagram showing the suction surface of the near-tongue nozzle vane according to an embodiment.
Figure 16:
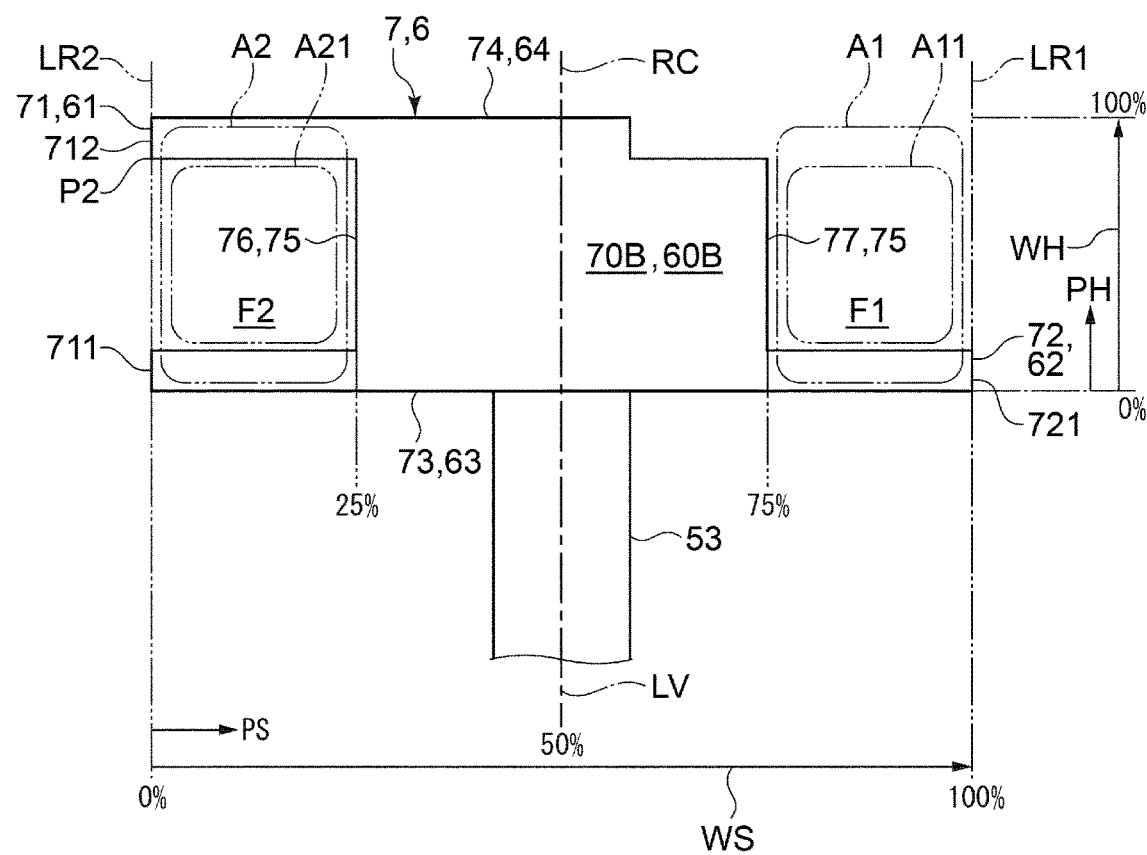
FIG. 16 is a diagram showing the suction surface of the near-tongue nozzle vane according to an embodiment.

FIGS. 15 and 16 are each a diagram showing the suction surface of the near-tongue nozzle vane according to an embodiment.

In some embodiments, as shown in FIGS. 9 and 11, the leading edge-side notch 76 is not formed in a range where the blade height position PH is 0% or more and less than 15% and a region more than 85% and 100% or less. In plan view with the suction surface 60B as front, as shown in FIGS. 9 and 11, the leading edge 71 has a hub-side edge 711 extending from the hub-side end of the leading edge-side notch 76 along the opposite direction to the blade height direction WH, and a shroud-side edge 712 extending from the shroud-side end of the leading edge-side notch 76 along the blade height direction WH. The hub-side edge 711 is connected to the hub-side end 73, and the shroud-side edge 712 is connected to the shroud-side end 74.

In some embodiments, as shown in FIGS. 9 and 10, the trailing edge-side notch 77 is not formed in a range where the blade height position PH is 0% or more and less than 15% and a region more than 85% and 100% or less. In plan view with the suction surface 60B as front, as shown in FIGS. 9 and 10, the trailing edge 72 has a hub-side edge 721 extending from the hub-side end of the trailing edge-side notch 77 along the opposite direction to the blade height direction WH, and a shroud-side edge 722 extending from the shroud-side end of the trailing edge-side notch 77 along the blade height direction WH. The hub-side edge 721 is connected to the hub-side end 73, and the shroud-side edge 722 is connected to the shroud-side end 74.

As shown in FIGS. 15 and 16, at least portions of the leading edge-side notch 76 and the trailing edge-side notch 77 may be formed in a range where the blade height position PH is 0% or more and less than 15%, and may be formed in a range where the blade height position PH is more than 85% and 100% or less. Further, as shown in FIG. 16, at least portions may be formed in a range where the blade length position PS is more than 25% and less than 75%.

(Size of Blade Height of Nozzle Vane)

Figure 17:
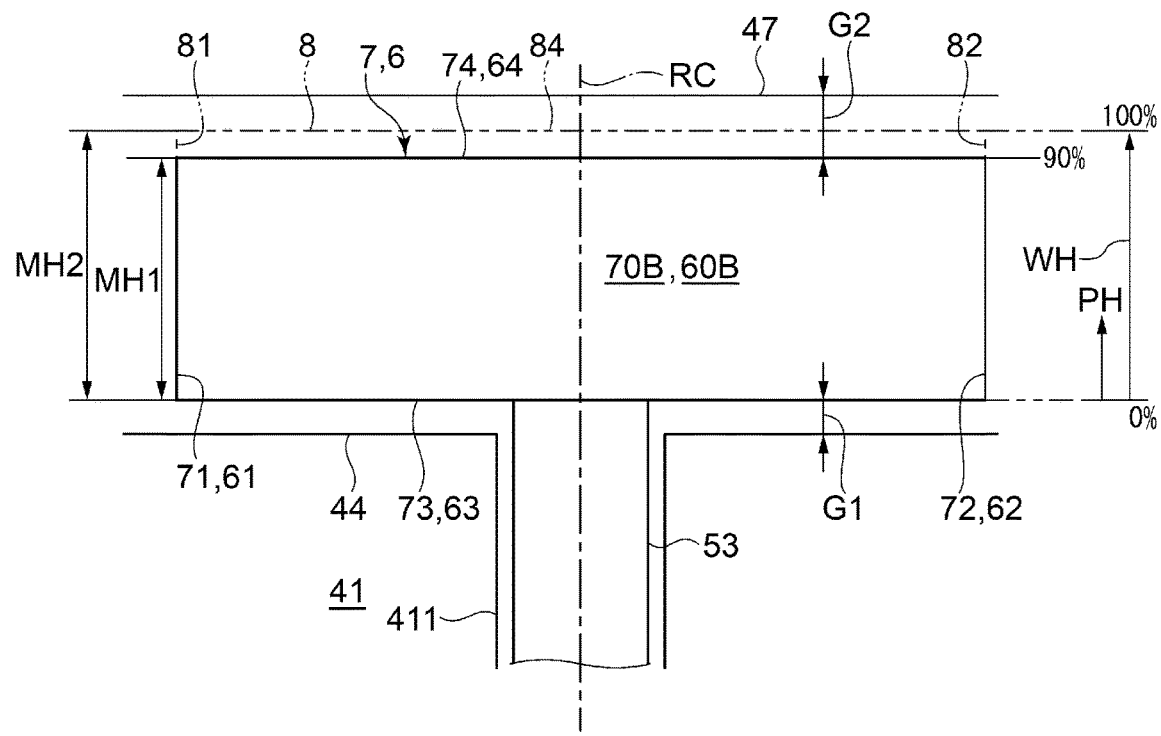
FIG. 17 is a diagram showing the suction surface of the near-tongue nozzle vane according to an embodiment.
Figure 18:
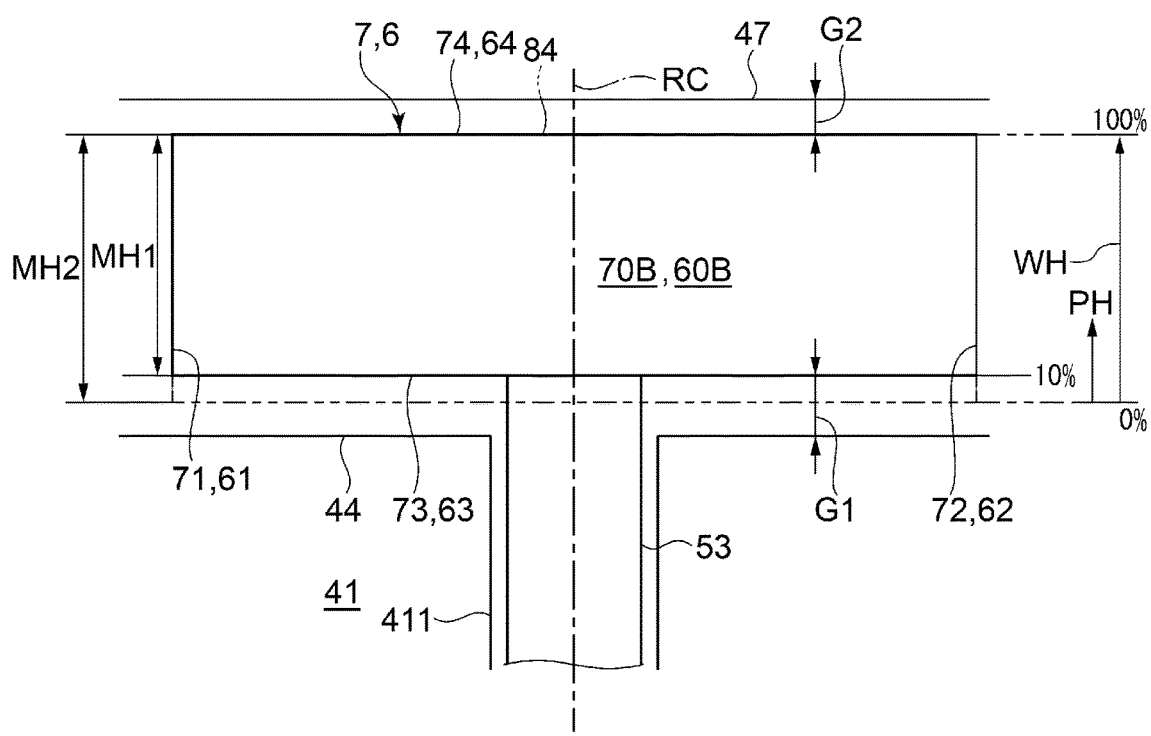
FIG. 18 is a diagram showing the suction surface of the near-tongue nozzle vane according to an embodiment.
Figure 19:
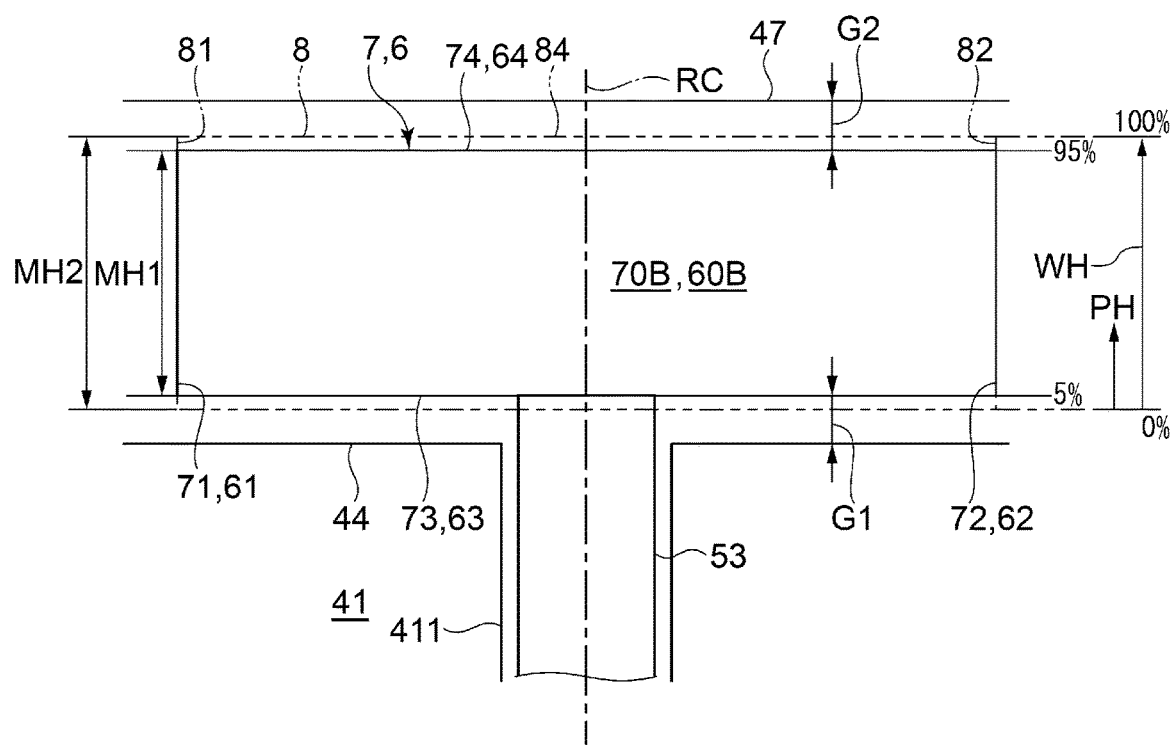
FIG. 19 is a diagram showing the suction surface of the near-tongue nozzle vane according to an embodiment.

FIGS. 17 to 19 are each a diagram showing the suction surface of the near-tongue nozzle vane according to an embodiment.

As shown in FIG. 2, the variable geometry turbine 2 (2B) according to some embodiments includes the above-described turbine rotor 21, the above-described scroll passage forming part 26 which forms the scroll passage 25, the above-described exhaust gas passage forming part 4 which forms the exhaust gas passage 40, and the above-described variable nozzle unit 5 including the plurality of nozzle vanes 6 and the rotation mechanism part 51. As shown in FIG. 4, the plurality of nozzle vanes 6 includes at least one near-tongue nozzle vane 7 disposed in the near-tongue region 40A and at least one far-tongue nozzle vane 8 disposed in the far-tongue region 40B. As shown in FIGS. 17 to 19, at least one near-tongue nozzle vane 7 of the variable geometry turbine 2 (2B) has a shorter maximum length MH1 in the blade height direction WH from the hub-side end 73 to the shroud-side end 74 of the near-tongue nozzle vane 7 than the maximum length MH2 of the far-tongue nozzle vane 8 in the blade height direction WH.

In FIGS. 17 to 19, the blade height position PH, in the blade height direction WH from the hub-side end 83 to the shroud-side end 84 of the far-tongue nozzle vane 8, of the hub-side end 83 is 0%, and the blade height position PH of the shroud-side end 84 in the blade height direction WH is 100%.

In the embodiment shown in FIG. 17, the near-tongue nozzle vane 7 has a reduced blade height on the shroud side, compared to the far-tongue nozzle vane 8. The near-tongue nozzle vane 7 is configured such that the blade height position PH of the shroud-side end 74 is 90% or less, so that the gap G2 between the shroud-side end 74 and the shroud-side passage surface 47 is larger than that of the far-tongue nozzle vane 8.

In the embodiment shown in FIG. 18, the near-tongue nozzle vane 7 has a reduced blade height on the hub side compared to the far-tongue nozzle vane 8. The near-tongue nozzle vane 7 is configured such that the blade height position PH of the hub-side end 73 is 10% or more, so that the gap G1 between the hub-side end 73 and the hub-side passage surface 44 is larger than that of the far-tongue nozzle vane 8.

In the embodiment shown in FIG. 19, the near-tongue nozzle vane 7 has a reduced blade height on the hub side and shroud side, compared to the far-tongue nozzle vane 8. The near-tongue nozzle vane 7 is configured such that the blade height position PH of the shroud-side end 74 is 95% or less and the blade height position PH of the hub-side end 73 is 5% or more, so that the gap G1 and the gap G2 are larger than those of the far-tongue nozzle vane 8.

Figure 20:
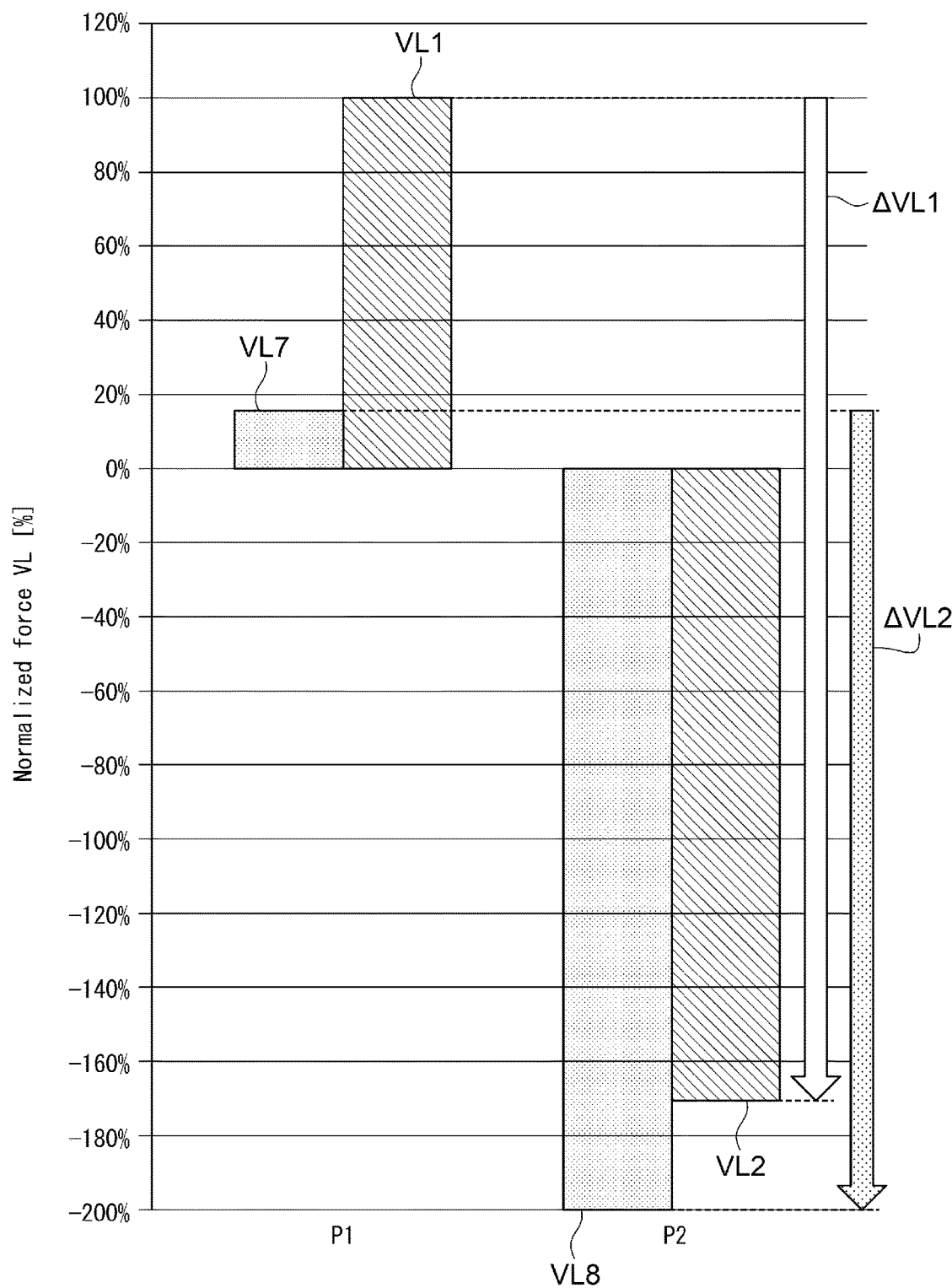
FIG. 20 is an explanatory diagram for describing load evaluation results of the near-tongue nozzle vane shown in FIG. 17.

FIG. 20 is an explanatory diagram for describing load evaluation results of the near-tongue nozzle vane shown in FIG. 17. In FIG. 20, the load VL acting on the nozzle vane is evaluated as a ratio to the maximum load in a given direction (positive direction) 100%. It shows the load VL7 acting on the near-tongue nozzle vane 7 (7A) in which the maximum length MH1 is shorter than the maximum length MH2 under a pressure condition of the lower pressure limit PL and the load VL8 acting on the nozzle vane 7 (7A) in which the maximum length MH1 is shorter than the maximum length MH2 under a pressure condition of the upper pressure limit PU. It also shows the load VL1 acting on the near-tongue nozzle vane 7 (7A) in which the maximum length MH1 is equal to the maximum length MH2 under a pressure condition of the lower pressure limit PL and the load VL2 acting on the nozzle vane 7 (7A) in which the maximum length MH1 is equal to the maximum length MH2 under a pressure condition of the upper pressure limit PU. The variation AVL2 in load between the load VL7 and the load VL8 is less than the variation in load AVL1 between the load VL1 and the load VL2.

With the above configuration, fluid force due to secondary flow is applied to the shroud and hub side regions of the nozzle vane 6. This fluid force fluctuates with pressure fluctuations of the variable geometry turbine 2. By making the maximum length MH1 of the near-tongue nozzle vane 7 in the blade height direction shorter than that of the far-tongue nozzle vane 8, the shroud and hub side regions of the near-tongue nozzle vane 7 can be made smaller (i.e., the gaps G1 and G2 are made larger), so that the fluid force due to secondary flow acting on the near-tongue nozzle vane 7 can be reduced. As a result, by making the maximum length MH1 of the near-tongue nozzle vane 7 in the blade height direction shorter than that of the far-tongue nozzle vane 8, compared to the case where the maximum lengths MH1 and MH2 of the near-tongue nozzle vane 7 and the far-tongue nozzle vane 8 in the blade height direction are the same, the variation in load acting on the near-tongue nozzle vane 7 during one cycle of pulsation of the internal combustion engine 10 can be reduced. By reducing the variation in load acting on the near-tongue nozzle vane 7, the wear of the vane shaft 53 fixed to the near-tongue nozzle vane 7 can be suppressed, thereby improving the reliability and durability of the variable geometry turbine 2.

In some embodiments, as shown in FIGS. 17 to 19, when the maximum length MH2 of the far-tongue nozzle vane 8 in the blade height direction WH from the hub-side end 83 to the shroud-side end 84 is 100%, the at least one near-tongue nozzle vane 7 is configured such that the maximum length MH1 of the near-tongue nozzle vane 7 in the blade height direction WH is 90% or less.

With the above configuration, by making the maximum length MH1 of the near-tongue nozzle vane 7 in the blade height direction WH 90% or less of the maximum length MH2 of the far-tongue nozzle vane 8 in the blade height direction WH, the shroud and hub side regions of the near-tongue nozzle vane 7 can be made smaller (i.e., the gaps G1 and G2 are made larger), so that the fluid force due to secondary flow acting on the near-tongue nozzle vane 7 can be effectively reduced, and the variation in load acting on the near-tongue nozzle vane 7 during one cycle of pulsation of the internal combustion engine 10 can be effectively reduced. Thus, it is possible to effectively suppress the wear of the vane shaft 53 fixed to the near-tongue nozzle vane 7.

Figure 21:
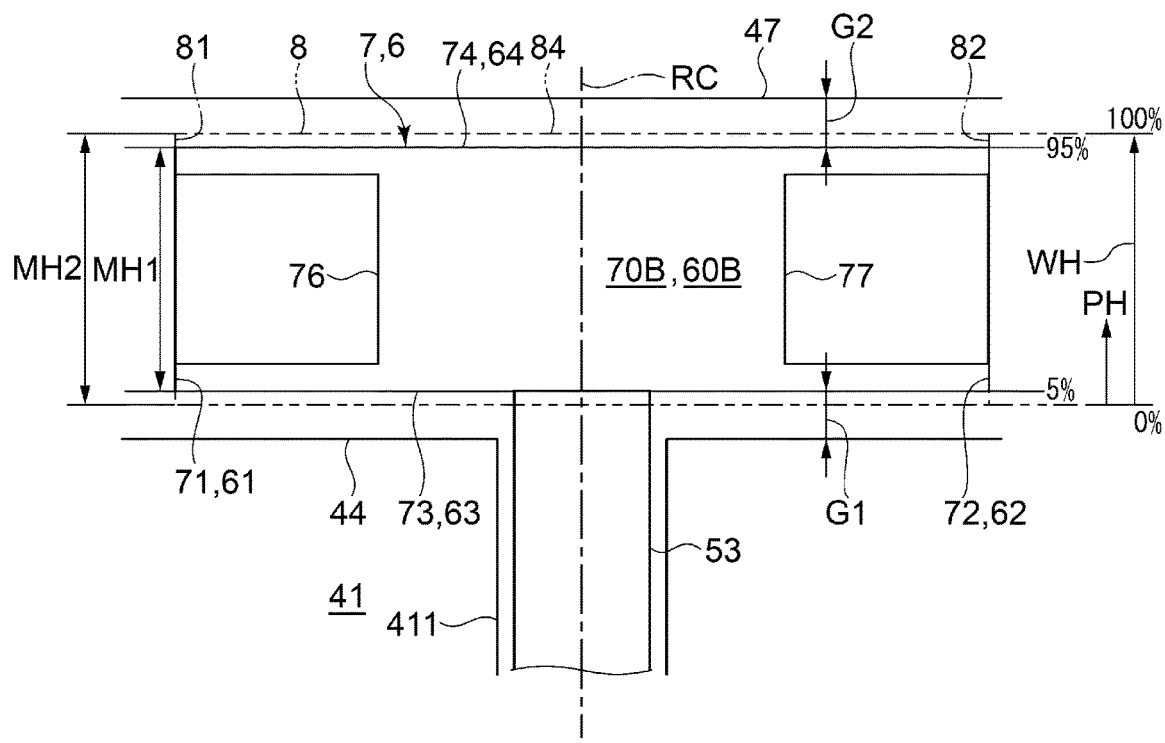
FIG. 21 is a diagram showing the suction surface of the near-tongue nozzle vane according to an embodiment.

FIG. 21 is a diagram showing the suction surface of the near-tongue nozzle vane according to an embodiment.

In some embodiments, as shown in FIG. 21, the at least one near-tongue nozzle vane 7 has, in at least one of the leading edge 71 or the trailing edge 72, a notch 75 that is cut out to a greater extent than the leading edge 81 or the trailing edge 82 of the far-tongue nozzle vane 8, and the maximum length MH1 of the near-tongue nozzle vane 7 in the blade height direction WH is shorter than the maximum length MH2 of the far-tongue nozzle vane 8 in the blade height direction WH.

With the above configuration, fluid force due to secondary flow is applied to the shroud and hub side regions of the nozzle vane 6. This fluid force fluctuates with pressure fluctuations of the variable geometry turbine 2. By making the maximum length MH1 of the near-tongue nozzle vane 7 in the blade height direction shorter than that of the far-tongue nozzle vane 8, the shroud and hub side regions of the near-tongue nozzle vane 7 can be made smaller, so that the fluid force due to secondary flow acting on the near-tongue nozzle vane 7 can be reduced. By reducing the fluid force due to secondary flow, the variation in load acting on the near-tongue nozzle vane 7 during one cycle of pulsation of the internal combustion engine 10 can be reduced. Thus, by reducing the variation in load acting on the near-tongue nozzle vane 7, the wear of the vane shaft 53 fixed to the near-tongue nozzle vane 7 having the notch 75 can be effectively suppressed.

In some embodiments, as shown in FIG. 4, regarding an angular position around the scroll center of the scroll passage 25, when the angular position α is defined such that, with the angular position of the tongue portion 29 being 0°, the angle gradually increases from the tongue portion 29 toward the downstream side of the scroll passage 25, the near-tongue region 40A satisfies a condition of −90°≤α≤90°. The near-tongue region 40A preferably satisfies a condition of −60°≤α≤60°. More preferably, it satisfies a condition of −45°≤α≤45°. Whether the nozzle vane 6 is located in the near-tongue region 40A may be determined by whether the rotation center RC of the nozzle vane 6 is located in the near-tongue region 40A.

With the above configuration, the near-tongue region 40A satisfying the angular position α condition of −90°≤α≤90° is more likely to cause the reversal of the direction of the load acting on the nozzle vane 6 in the region due to pressure fluctuations during one pulsation cycle of the internal combustion engine 10 than in the far-tongue region 40B not satisfying the above angular position α condition, and thus wear of the nozzle vane 6 is likely to occur in this region. By providing the notch 75 in the nozzle vane 6 disposed in the near-tongue region 40A satisfying the above condition, or by shortening the maximum length MH1 in the blade height direction WH, the wear of the vane shaft 53 fixed to the near-tongue nozzle vane 7 can be effectively suppressed.

As shown in FIG. 2, the turbocharger 1 according to some embodiments includes the above-described variable geometry turbine 2 (2A, 2B) and a centrifugal compressor 3 configured to be driven by the variable geometry turbine 2 (2A, 2B).

With the above configuration, since the wear of the vane shaft 53 fixed to the near-tongue nozzle vane 7 can be suppressed, it is possible to improve the reliability and durability of the variable geometry turbine 2 and the turbocharger 1 including the variable geometry turbine 2. The efficiency of the variable geometry turbine 2 is not significantly reduced by providing the notch 75 in the near-tongue nozzle vane 7 or by shortening the maximum length MH1 in the blade height direction WH.

The present disclosure is not limited to the embodiments described above, but includes modifications to the embodiments described above, and embodiments composed of combinations of those embodiments.

The contents described in the above embodiments would be understood as follows, for instance.

1) A variable geometry turbine (2, 2A) according to at least one embodiment of the present disclosure includes: a turbine rotor (21); a scroll passage forming part (26) which forms a scroll passage (25) on an outer peripheral side of the turbine rotor (21); an exhaust gas passage forming part (4) which forms an exhaust gas passage (40) for introducing an exhaust gas from the scroll passage (25) to the turbine rotor (21); and a variable nozzle unit (5) for adjusting a flow of the exhaust gas in the exhaust gas passage (40). The variable nozzle unit (5) includes: a plurality of nozzle vanes (6) disposed in the exhaust gas passage (40) at intervals in a circumferential direction of the turbine rotor (21); and a rotation mechanism part (51) configured to rotate the plurality of nozzle vanes (6) about respective rotation centers (RC). When the exhaust gas passage (40) is divided into a near-tongue region (40A) in the vicinity of a tongue portion (29) of the scroll passage (25) and a far-tongue region (40B) which is a region other than the near-tongue region (40A), the plurality of nozzle vanes (6) includes at least one near-tongue nozzle vane (7) disposed in the near-tongue region (40A) and at least one far-tongue nozzle vane (8) disposed in the far-tongue region (40B). The at least one near-tongue nozzle vane (7) has, in at least one of a leading edge (71) or a trailing edge (72) of the near-tongue nozzle vane (7), a notch (75) that is cut out to a greater extent than a leading edge (81) or a trailing edge (82) of the far-tongue nozzle vane (8).

The present inventors found that the load acting on the leading edge and trailing edge sides of the near-tongue nozzle vane (7) changes significantly due to pressure fluctuations in the exhaust gas passage (40) during one cycle of pulsation of the internal combustion engine (10), and that the change in load on the leading edge and trailing edge sides is one of the causes of the reversal of the direction of action of the load on the near-tongue nozzle vane (7).

With the above configuration 1), by providing the notch (75) in at least one of the leading edge (71) or the trailing edge (72) of the near-tongue nozzle vane (7), the portion where fluid force from the exhaust gas flowing in the exhaust gas passage (40) acts can be selectively removed, so that the reversal of the direction of action of the load on the near-tongue nozzle vane (7) can be suppressed. By suppressing the reversal of the direction of action of the load on the near-tongue nozzle vane (7), it is possible to reduce the number of times the vane shaft (53) fixed to the near-tongue nozzle vane (7) collides with another part, thereby suppressing the wear of the vane shaft (53).

2) In some embodiments, in the variable geometry turbine (2, 2A) described in 1), the at least one near-tongue nozzle vane (7) has a trailing edge-side notch (77) which is the notch (75) formed in the trailing edge (72) of the near-tongue nozzle vane (7). When a blade length position, in a blade length direction from the leading edge (71) to the trailing edge (72) of the near-tongue nozzle vane (7), of the leading edge (71) is 0%, and a blade length position of the trailing edge (72) in the blade length direction is 100%, at least a portion of the trailing edge-side notch (77) is formed in a region (A1) within a range where a blade length position is 75% or more and 100% or less.

With the above configuration 2), in the trailing edge portion (a range where the blade length position is 75% or more and 100% or less) of the near-tongue nozzle vane (7), the load changes significantly due to pressure fluctuations in the exhaust gas passage (40) during one cycle of pulsation of the internal combustion engine (10), and the change in load on the trailing edge portion is one of the causes of the reversal of the direction of action of the load on the near-tongue nozzle vane (7). Therefore, by forming at least a portion of the trailing edge-side notch (77) in the trailing edge portion of the near-tongue nozzle vane (7), i.e., in the region (A1) within a range where the blade length position is 75% or more and 100% or less, the reversal of the direction of action of the load on the near-tongue nozzle vane (7) can be effectively suppressed.

3) In some embodiments, in the variable geometry turbine (2, 2A) described in 2), when a blade height position, in a blade height direction from a hub-side end (73) to a shroud-side end (74) of the near-tongue nozzle vane (7), of the hub-side end (73) is 0%, and a blade height position of the shroud-side end (74) in the blade height direction is 100%, at least a portion of the trailing edge-side notch (77) is formed in a region (A11) within a range where a blade height position is 15% or more and 85% or less.

With the above configuration 3), in the height middle portion (a range where the blade height position is 15% or more and 85% or less) on the trailing edge side of the near-tongue nozzle vane (7), the load changes significantly due to pressure fluctuations in the exhaust gas passage (40) during one cycle of pulsation of the internal combustion engine (10), and the change in load on the height middle portion on the trailing edge side is one of the causes of the reversal of the direction of action of the load on the near-tongue nozzle vane (7). Therefore, by forming at least a portion of the trailing edge-side notch (77) in the height middle portion on the trailing edge side of the near-tongue nozzle vane (7), i.e., in the region (A11) within a range where the blade height position is 15% or more and 85% or less, the reversal of the direction of action of the load on the near-tongue nozzle vane (7) can be effectively suppressed.

4) In some embodiments, in the variable geometry turbine (2, 2A) described in 2) or 3), the at least one near-tongue nozzle vane (7) has a leading edge-side notch (76) which is the notch (75) formed in the leading edge (71) of the near-tongue nozzle vane (7). At least a portion of the leading edge-side notch (76) is formed in a region (A2) within a range where the blade length position is 0% or more and 25% or less.

With the above configuration 4), in the leading edge portion (a range where the blade length position is 0% or more and 25% or less) of the near-tongue nozzle vane (7), the load changes significantly due to pressure fluctuations in the exhaust gas passage (40) during one cycle of pulsation of the internal combustion engine (10), and the change in load on the leading edge portion is one of the causes of the reversal of the direction of action of the load on the near-tongue nozzle vane (7). Therefore, by forming at least a portion of the leading edge-side notch (76) in the leading edge portion of the near-tongue nozzle vane (7), i.e., in the region (A2) within a range where the blade length position is 0% or more and 25% or less, the reversal of the direction of action of the load on the near-tongue nozzle vane (7) can be effectively suppressed.

5) In some embodiments, in the variable geometry turbine (2, 2A) described in 4), when a blade height position, in a blade height direction from a hub-side end (73) to a shroud-side end (74) of the near-tongue nozzle vane (7), of the hub-side end (73) is 0%, and a blade height position of the shroud-side end (74) in the blade height direction is 100%, at least a portion of the leading edge-side notch (76) is formed in a region (A21) within a range where a blade height position is 15% or more and 85% or less.

With the above configuration 5), in the height middle portion (a range where the blade height position is 15% or more and 85% or less) on the leading edge side of the near-tongue nozzle vane (7), the load changes significantly due to pressure fluctuations in the exhaust gas passage (40) during one cycle of pulsation of the internal combustion engine (10), and the change in load on the height middle portion on the leading edge side is one of the causes of the reversal of the direction of action of the load on the near-tongue nozzle vane (7). Therefore, by forming at least a portion of the leading edge-side notch (76) in the height middle portion on the leading edge side of the near-tongue nozzle vane (7), i.e., in the region (A21) within a range where the blade height position is 15% or more and 85% or less, the reversal of the direction of action of the load on the near-tongue nozzle vane (7) can be effectively suppressed.

6) In some embodiments, in the variable geometry turbine (2, 2A) described in 4) or 5), the at least one near-tongue nozzle vane (7) is configured such that the leading edge-side notch (76) and the trailing edge-side notch (77) have the same size.

With the above configuration 6), in the variable geometry turbine (2), a high-speed flow enters from the upstream side of the nozzle vane (6), and the nozzle vane (6) is subjected to fluid force by the surrounding flow. Therefore, the torque around the rotation center (RC) applied to the nozzle vane (6) should be small in order to maintain the nozzle vane (6) at a predetermined angle. By making the leading edge-side notch (76) and the trailing edge-side notch (77) of the near-tongue nozzle vane the same size, the fluid force applied to both the leading edge side and the trailing edge side of the near-tongue nozzle vane (7) can be equalized, so that the torque around the rotation center (RC) applied to the near-tongue nozzle vane can be reduced.

7) In some embodiments, in the variable geometry turbine (2, 2A) described in 4) or 5), the at least one near-tongue nozzle vane (7) is configured such that the trailing edge-side notch (77) is larger than the leading edge-side notch (76).

With the above configuration 7), the trailing edge-side notch (77) is more effective than the leading edge-side notch (76) in suppressing the reversal of the direction of action of the load on the near-tongue nozzle vane (7). Therefore, by making the trailing edge-side notch (77) larger than the leading edge-side notch (76) of the near-tongue nozzle vane (7), the reversal of the direction of action of the load on the near-tongue nozzle vane (7) can be effectively suppressed.

8) In some embodiments, in the variable geometry turbine (2, 2A) described in any one of 1) to 7), the at least one near-tongue nozzle vane (7) has a shorter maximum length (MH1) in a blade height direction from a hub-side end (73) to a shroud-side end (74) of the near-tongue nozzle vane (7) than that of the far-tongue nozzle vane (8).

With the above configuration 8), fluid force due to secondary flow is applied to the shroud and hub side regions of the nozzle vane (6). This fluid force fluctuates with pressure fluctuations of the variable geometry turbine (2). By making the maximum length (MH1) of the near-tongue nozzle vane (7) in the blade height direction shorter than that of the far-tongue nozzle vane (8), the shroud and hub side regions of the near-tongue nozzle vane (7) can be made smaller, so that the fluid force due to secondary flow acting on the near-tongue nozzle vane (7) can be reduced. By reducing the fluid force due to secondary flow; the variation in load acting on the near-tongue nozzle vane (7) during one cycle of pulsation of the internal combustion engine (10) can be reduced. Thus, by reducing the variation in load acting on the near-tongue nozzle vane (7), the wear of the vane shaft (53) fixed to the near-tongue nozzle vane (7) having the notch (75) can be effectively suppressed.

9) In some embodiments, in the variable geometry turbine (2, 2A) described in 8), when the maximum length (MH2) of the far-tongue nozzle vane (8) in a blade height direction from a hub-side end (83) to a shroud-side end (84) is 100%, the at least one near-tongue nozzle vane (7) is configured such that the maximum length (MH1) of the near-tongue nozzle vane (7) in the blade height direction is 90% or less.

With the above configuration 9), by making the maximum length (MH1) of the near-tongue nozzle vane (7) in the blade height direction 90% or less of the maximum length (MH2) of the far-tongue nozzle vane (8) in the blade height direction, the shroud and hub side regions of the near-tongue nozzle vane (7) can be made smaller, so that the fluid force due to secondary flow acting on the near-tongue nozzle vane (7) can be effectively reduced, and the variation in load acting on the near-tongue nozzle vane (7) during one cycle of pulsation of the internal combustion engine (10) can be effectively reduced. Thus, it is possible to effectively suppress the wear of the vane shaft (53) fixed to the near-tongue nozzle vane (7).

10) In some embodiments, in the variable geometry turbine (2) described in any one of 1) to 9), regarding an angular position around a scroll center of the scroll passage (25), when the angular position α is defined such that, with the angular position of the tongue portion (29) being 0°, the angle gradually increases from the tongue portion (29) toward a downstream side of the scroll passage (25), the near-tongue region (40A) satisfies a condition of −90°≤α≤90°.

With the above configuration 10), the near-tongue region (40A) satisfying the angular position α condition of −90°≤α≤90° is more likely to cause the reversal of the direction of the load acting on the nozzle vane (6) in the region due to pressure fluctuations during one pulsation cycle of the internal combustion engine (10) than in the far-tongue region (40B) not satisfying the above angular position α condition, and thus wear of the nozzle vane (6) is likely to occur in this region. By providing the notch (75) in the nozzle vane (6) disposed in the near-tongue region (40A) satisfying the above condition, the wear of the vane shaft (53) fixed to the near-tongue nozzle vane (7) can be effectively suppressed.

11) A variable geometry turbine (2, 2B) according to at least one embodiment of the present disclosure includes: a turbine rotor (21); a scroll passage forming part (26) which forms a scroll passage (25) on an outer peripheral side of the turbine rotor (21); an exhaust gas passage forming part (4) which forms an exhaust gas passage (40) for introducing an exhaust gas from the scroll passage (25) to the turbine rotor (21); and a variable nozzle unit (5) for adjusting a flow of the exhaust gas in the exhaust gas passage (40). The variable nozzle unit (5) includes: a plurality of nozzle vanes (6) disposed in the exhaust gas passage (40) at intervals in a circumferential direction of the turbine rotor (21); and a rotation mechanism part (51) configured to rotate the plurality of nozzle vanes (6) about respective rotation centers (RC). When the exhaust gas passage (40) is divided into a near-tongue region (40A) in the vicinity of a tongue portion (29) of the scroll passage (25) and a far-tongue region (40B) which is a region other than the near-tongue region (40A), the plurality of nozzle vanes (6) includes at least one near-tongue nozzle vane (7) disposed in the near-tongue region (40A) and at least one far-tongue nozzle vane (8) disposed in the far-tongue region (40B). The at least one near-tongue nozzle vane (7) has a shorter maximum length (MH1) in a blade height direction from a hub-side end (73) to a shroud-side end (74) of the near-tongue nozzle vane (7) than that of the far-tongue nozzle vane (8).

With the above configuration 11), fluid force due to secondary flow is applied to the shroud and hub side regions of the nozzle vane (6). This fluid force fluctuates with pressure fluctuations of the variable geometry turbine (2). By making the maximum length of the near-tongue nozzle vane (7) in the blade height direction shorter than that of the far-tongue nozzle vane (8), the shroud and hub side regions of the near-tongue nozzle vane (7) can be made smaller, so that the fluid force due to secondary flow acting on the near-tongue nozzle vane (7) can be reduced. As a result, by making the maximum length (MH1) of the near-tongue nozzle vane (7) in the blade height direction shorter than that of the far-tongue nozzle vane (8), compared to the case where the maximum lengths (MH1 and MH2) of the near-tongue nozzle vane (7) and the far-tongue nozzle vane (8) in the blade height direction are the same, the variation in load acting on the near-tongue nozzle vane (7) during one cycle of pulsation of the internal combustion engine (10) can be reduced. By reducing the variation in load acting on the near-tongue nozzle vane (7), the wear of the vane shaft (53) fixed to the near-tongue nozzle vane (7) can be suppressed, thereby improving the reliability and durability of the variable geometry turbine (2).

12) A turbocharger (1) according to at least one embodiment of the present disclosure includes the variable geometry turbine (2A) described in any one of 1) to 10), and a centrifugal compressor (3) configured to be driven by the variable geometry turbine (2A).

With the above configuration 12), since the near-tongue nozzle vane (7) of the variable geometry turbine (2A) has the notch (75), the wear of the vane shaft (53) fixed to the near-tongue nozzle vane (7) can be suppressed, so that it is possible to improve the reliability and durability of the variable geometry turbine (2A) and the turbocharger (1) including the variable geometry turbine (2A).

13) A turbocharger (1) according to at least one embodiment of the present disclosure includes the variable geometry turbine (2B) described in 11), and a centrifugal compressor (3) configured to be driven by the variable geometry turbine (2B).

With the above configuration 13), since the maximum length (MH1) of the near-tongue nozzle vane (7) of the variable geometry turbine (2B) in the blade height direction is short, the wear of the vane shaft (53) fixed to the near-tongue nozzle vane (7) can be suppressed, so that it is possible to improve the reliability and durability of the variable geometry turbine (2B) and the turbocharger (1) including the variable geometry turbine (2B).

REFERENCE SIGNS LIST

1 Turbocharger
1A Exhaust turbocharger
2, 2A, 2B Variable geometry turbine
3 Centrifugal compressor
4 Exhaust gas passage forming part
5 Variable nozzle unit
6 Nozzle vane
7, 7A Near-tongue nozzle vane
8, 8B Far-tongue nozzle vane
10 Internal combustion engine
11 Rotational shaft
12 Bearing
13 Housing
14 Bearing housing
15 Gas line
16 Exhaust gas line
17 Interior space
21 Turbine rotor
22 Turbine housing
23 Exhaust gas introduction port
24 Exhaust gas discharge port
25 Scroll passage
26 Scroll passage forming part
27 Exhaust gas discharge passage
28 Exhaust gas discharge passage forming part
29 Tongue portion
31 Impeller
32 Compressor housing
33 Gas introduction port
34 Gas discharge port
35 Gas introduction passage 36 Gas introduction passage forming part
37 Scroll passage
38 Scroll passage forming part
40 Exhaust gas passage
40A Near-tongue region
40B Far-tongue region
41 Nozzle mount
42 Nozzle plate
43, 45 Annular plate part
44 Hub-side passage surface
46 Protruding part
47 Shroud-side passage surface
48 Shroud surface
49 Nozzle support
51 Rotation mechanism part
52 Drive ring
53 Vane shaft
54 Lever plate
55 Actuator
56 Drive shaft
57 Controller
60, 70, 80 Blade surface
60A, 70A, 80A Pressure surface
60B, 70B, 80B Suction surface
61, 71, 81 Leading edge
62, 72, 82 Trailing edge
63, 73, 83 Hub-side end
64, 74, 84 Shroud-side end
75, 85 Notch
76, 86 Leading edge-side notch
77, 87 Trailing edge-side notch
A1, A2, A11, A21 Region
F1, F2 Area
G1, G2 Gap
LA, LC Axis
LR1, LR2 Line
LV Virtual line
P1 Trailing edge point
P2 Leading edge point
PH Blade height position
PL Lower pressure limit
PS Blade length position
PU Upper pressure limit
RC Rotation center
T1 Period
VL, VL1 to VL8 Load
WH Blade height direction
WS Blade length direction
X Axial direction (of rotational shaft)
XC Compressor side
XT Turbine side
Y Radial direction (of rotational shaft)

The invention claimed is:

1. A variable geometry turbine, comprising:
a turbine rotor;
a scroll passage forming part which forms a scroll passage on an outer peripheral side of the turbine rotor;
an exhaust gas passage forming part which forms an exhaust gas passage for introducing an exhaust gas from the scroll passage to the turbine rotor; and
a variable nozzle unit for adjusting a flow of the exhaust gas in the exhaust gas passage,
wherein the variable nozzle unit includes:
 a plurality of nozzle vanes disposed in the exhaust gas passage at intervals in a circumferential direction of the turbine rotor; and
 a rotation mechanism part configured to rotate the plurality of nozzle vanes about respective rotation centers,
wherein, when the exhaust gas passage is divided into a near-tongue region in the vicinity of a tongue portion of the scroll passage and a far-tongue region which is a region other than the near-tongue region, the plurality of nozzle vanes includes at least one near-tongue nozzle vane disposed in the near-tongue region and at least one far-tongue nozzle vane disposed in the far-tongue region, and
wherein the at least one near-tongue nozzle vane has, in at least one of a leading edge or a trailing edge of the near-tongue nozzle vane, a notch that is cut out to a greater extent than a leading edge or a trailing edge of the far-tongue nozzle vane.

2. The variable geometry turbine according to claim 1,
wherein the at least one near-tongue nozzle vane has a trailing edge-side notch which is the notch formed in the trailing edge of the near-tongue nozzle vane, and
wherein, when a blade length position, in a blade length direction from the leading edge to the trailing edge of the near-tongue nozzle vane, of the leading edge is 0%, and a blade length position of the trailing edge in the blade length direction is 100%, at least a portion of the trailing edge-side notch is formed in a region within a range where a blade length position is 75% or more and 100% or less.

3. The variable geometry turbine according to claim 2,
wherein, when a blade height position, in a blade height direction from a hub-side end to a shroud-side end of the near-tongue nozzle vane, of the hub-side end is 0%, and a blade height position of the shroud-side end in the blade height direction is 100%, at least a portion of the trailing edge-side notch is formed in a region within a range where a blade height position is 15% or more and 85% or less.

4. The variable geometry turbine according to claim 2,
wherein the at least one near-tongue nozzle vane has a leading edge-side notch which is the notch formed in the leading edge of the near-tongue nozzle vane, and
wherein at least a portion of the leading edge-side notch is formed in a region within a range where the blade length position is 0% or more and 25% or less.

5. The variable geometry turbine according to claim 4,
wherein, when a blade height position, in a blade height direction from a hub-side end to a shroud-side end of the near-tongue nozzle vane, of the hub-side end is 0%, and a blade height position of the shroud-side end in the blade height direction is 100%, at least a portion of the leading edge-side notch is formed in a region within a range where a blade height position is 15% or more and 85% or less.

6. The variable geometry turbine according to claim 4,
wherein the at least one near-tongue nozzle vane is configured such that the leading edge-side notch and the trailing edge-side notch have the same size.

7. The variable geometry turbine according to claim 4,
wherein the at least one near-tongue nozzle vane is configured such that the trailing edge-side notch is larger than the leading edge-side notch.

8. The variable geometry turbine according to claim 1,
wherein the at least one near-tongue nozzle vane has a shorter maximum length in a blade height direction from a hub-side end to a shroud-side end of the near-tongue nozzle vane than that of the far-tongue nozzle vane.

9. The variable geometry turbine according to claim 8, wherein, when the maximum length of the far-tongue nozzle vane in a blade height direction from a hub-side end to a shroud-side end of the far-tongue nozzle vane is 100%, the at least one near-tongue nozzle vane is configured such that the maximum length of the near-tongue nozzle vane in the blade height direction is 90% or less.

10. The variable geometry turbine according to claim 1, wherein, regarding an angular position around a scroll center of the scroll passage, when the angular position α is defined such that, with the angular position of the tongue portion being 0°, the angle gradually increases from the tongue portion toward a downstream side of the scroll passage,
the near-tongue region satisfies a condition of $-90° \leq \alpha \leq 90°$.

11. A variable geometry turbine, comprising:
a turbine rotor;
a scroll passage forming part which forms a scroll passage on an outer peripheral side of the turbine rotor;
an exhaust gas passage forming part which forms an exhaust gas passage for introducing an exhaust gas from the scroll passage to the turbine rotor; and
a variable nozzle unit for adjusting a flow of the exhaust gas in the exhaust gas passage,
wherein the variable nozzle unit includes:
   a plurality of nozzle vanes disposed in the exhaust gas passage at intervals in a circumferential direction of the turbine rotor; and
   a rotation mechanism part configured to rotate the plurality of nozzle vanes about respective rotation centers,
wherein, when the exhaust gas passage is divided into a near-tongue region in the vicinity of a tongue portion of the scroll passage and a far-tongue region which is a region other than the near-tongue region, the plurality of nozzle vanes includes at least one near-tongue nozzle vane disposed in the near-tongue region and at least one far-tongue nozzle vane disposed in the far-tongue region, and
wherein the at least one near-tongue nozzle vane has a shorter maximum length in a blade height direction from a hub-side end to a shroud-side end of the near-tongue nozzle vane than that of the far-tongue nozzle vane,
wherein the at least one near-tongue nozzle vane has, in at least one of a leading edge or a trailing edge of the near tongue nozzle vane a notch that is cut out to a greater extent than a leading edge or a trailing edge of the far-tongue nozzle vane.

12. A turbocharger, comprising:
the variable geometry turbine according to claim 1; and
a centrifugal compressor configured to be driven by the variable geometry turbine.

13. A turbocharger, comprising:
the variable geometry turbine according to claim 11; and
a centrifugal compressor configured to be driven by the variable geometry turbine.

* * * * *